(12) United States Patent
Black et al.

(10) Patent No.: US 8,594,252 B2
(45) Date of Patent: Nov. 26, 2013

(54) INTERFERENCE CANCELLATION FOR WIRELESS COMMUNICATIONS

(75) Inventors: Peter J. Black, San Diego, CA (US); Christopher G. Lott, San Diego, CA (US); Rashid A. Attar, San Diego, CA (US); Yu-Cheun Jou, San Diego, CA (US); Jun Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 548 days.

(21) Appl. No.: 12/564,633

(22) Filed: Sep. 22, 2009

(65) Prior Publication Data

US 2010/0061496 A1    Mar. 11, 2010

Related U.S. Application Data

(63) Continuation-in-part of application No. 12/424,050, filed on Apr. 15, 2009, and a continuation-in-part of application No. 12/389,211, filed on Feb. 19, 2009, application No. 12/564,633, which is a continuation-in-part of application No. 12/484,472, filed on Jun. 15, 2009, now abandoned, and a continuation-in-part of application No. 11/334,977, filed on Jan. 18, 2006.

(60) Provisional application No. 61/060,119, filed on Jun. 9, 2008, provisional application No. 61/060,408, filed on Jun. 10, 2008, provisional application No. 61/061,546, filed on Jun. 13, 2008, provisional application No. 61/030,215, filed on Feb. 20, 2008, provisional application No. 60/710,405, filed on Aug. 22, 2005, provisional application No. 60/713,549, filed on Aug. 31, 2005, provisional application No. 60/710,370, filed on Aug. 22, 2005, provisional application No. 60/713,517, filed on Aug. 31, 2005.

(51) Int. Cl.
*H04L 1/00* (2006.01)
*H04L 27/28* (2006.01)

(52) U.S. Cl.
USPC .......................................... 375/346; 375/260

(58) Field of Classification Search
USPC ......... 375/346, 260, 316, 340, 347, 348, 349; 370/310, 342, 335; 455/63, 296, 302, 455/334
See application file for complete search history.

(56) References Cited

U.S. PATENT DOCUMENTS

| 4,718,066 A | 1/1988 | Rogard |
| 4,885,744 A | 12/1989 | Lespagnol et al. |

(Continued)

FOREIGN PATENT DOCUMENTS

| CN | 1347604 A | 5/2002 |
| CN | 1394407 A | 1/2003 |

(Continued)

OTHER PUBLICATIONS

International Search Report—PCT/US2010/049702—ISA/EPO—Mar. 17, 2011.

(Continued)

*Primary Examiner* — Khai Tran
(74) *Attorney, Agent, or Firm* — Larry J. Moskowitz; Mary A. Fales

(57) ABSTRACT

Techniques for improving the capacity of a wireless communications system using interference cancellation (IC). In an early decoding and IC aspect, a frame transmitted from a user to a base station may be decoded prior to the entire frame being received by the base station. The remaining portion of the frame may then be re-constructed at the base station prior to its reception, and cancelled from the receive signal to reduce the interference to frames received from other users. In a power control aspect for early decoding and IC, the power control target level at a local base station may be adjusted in response to successfully early decoding a frame, without affecting the overall outer loop power control operation. Further aspects include late decoding techniques for utilizing the IC of other users' signals to improve the probability of decoding a given user's frames, as well as techniques for traffic channel demodulation using channel re-estimation.

32 Claims, 22 Drawing Sheets

(56) References Cited

U.S. PATENT DOCUMENTS

| | | | |
|---|---|---|---|
| 5,710,784 A | 1/1998 | Kindred et al. | |
| 5,751,725 A | 5/1998 | Chen | |
| 5,774,450 A | 6/1998 | Harada et al. | |
| 5,774,496 A | 6/1998 | Butler et al. | |
| 5,960,361 A | 9/1999 | Chen | |
| 5,983,383 A | 11/1999 | Wolf | |
| 6,108,373 A | 8/2000 | Fargues et al. | |
| 6,169,759 B1 | 1/2001 | Kanterakis et al. | |
| 6,282,233 B1* | 8/2001 | Yoshida | 375/148 |
| 6,285,682 B1 | 9/2001 | Proctor et al. | |
| 6,396,867 B1 | 5/2002 | Tiedemann, Jr. et al. | |
| 6,532,254 B1 | 3/2003 | Jokinen | |
| 6,545,989 B1 | 4/2003 | Butler | |
| 6,553,224 B1 | 4/2003 | Kim | |
| 6,633,601 B1 | 10/2003 | Yang | |
| 6,741,661 B2 | 5/2004 | Wheatley, III et al. | |
| 6,747,963 B1 | 6/2004 | Park et al. | |
| 6,765,531 B2 | 7/2004 | Anderson | |
| 6,771,934 B2 | 8/2004 | Demers et al. | |
| 6,917,607 B1 | 7/2005 | Yeom et al. | |
| 6,956,893 B2 | 10/2005 | Frank et al. | |
| 6,975,604 B1 | 12/2005 | Ishida et al. | |
| 6,977,888 B1 | 12/2005 | Frenger et al. | |
| 7,006,439 B2 | 2/2006 | Thron et al. | |
| 7,006,795 B2 | 2/2006 | Foschini et al. | |
| 7,042,869 B1 | 5/2006 | Bender | |
| 7,130,365 B2 | 10/2006 | Li | |
| 7,167,502 B1 | 1/2007 | Tsaur | |
| 7,224,962 B1 | 5/2007 | Kite | |
| 7,302,009 B2* | 11/2007 | Walton et al. | 375/267 |
| 7,466,666 B2 | 12/2008 | Yoon et al. | |
| 2001/0018650 A1 | 8/2001 | DeJaco | |
| 2002/0006138 A1 | 1/2002 | Odenwalder | |
| 2002/0046379 A1 | 4/2002 | Miki et al. | |
| 2002/0071407 A1 | 6/2002 | Koo et al. | |
| 2002/0131381 A1 | 9/2002 | Kim et al. | |
| 2002/0131532 A1 | 9/2002 | Chi et al. | |
| 2003/0004784 A1 | 1/2003 | Li et al. | |
| 2003/0041206 A1 | 2/2003 | Dickie | |
| 2003/0125037 A1 | 7/2003 | Bae et al. | |
| 2003/0134656 A1 | 7/2003 | Chang et al. | |
| 2003/0199290 A1 | 10/2003 | Viertola | |
| 2003/0212816 A1 | 11/2003 | Bender et al. | |
| 2003/0223396 A1 | 12/2003 | Tsai et al. | |
| 2004/0005897 A1 | 1/2004 | Tomoe et al. | |
| 2004/0081124 A1 | 4/2004 | Black et al. | |
| 2004/0081195 A1 | 4/2004 | El-Maleh et al. | |
| 2004/0085936 A1 | 5/2004 | Gopalakrishnan et al. | |
| 2004/0131007 A1 | 7/2004 | Smee et al. | |
| 2004/0141525 A1 | 7/2004 | Bhushan et al. | |
| 2004/0157614 A1 | 8/2004 | Fujita et al. | |
| 2004/0160933 A1 | 8/2004 | Odenwalder et al. | |
| 2004/0198404 A1 | 10/2004 | Attar et al. | |
| 2004/0223507 A1 | 11/2004 | Kuchibhotla et al. | |
| 2004/0229615 A1 | 11/2004 | Agrawal | |
| 2004/0240400 A1 | 12/2004 | Khan | |
| 2004/0240416 A1 | 12/2004 | Derryberry et al. | |
| 2005/0013263 A1 | 1/2005 | Kim et al. | |
| 2005/0018614 A1 | 1/2005 | Kiran | |
| 2005/0058154 A1 | 3/2005 | Lee et al. | |
| 2005/0185364 A1 | 8/2005 | Bell et al. | |
| 2005/0265399 A1 | 12/2005 | El-Maleh et al. | |
| 2006/0050666 A1 | 3/2006 | Odenwalder | |
| 2006/0126844 A1 | 6/2006 | Mauro | |
| 2006/0141933 A1 | 6/2006 | Smee et al. | |
| 2006/0209783 A1 | 9/2006 | Jain et al. | |
| 2006/0209902 A1 | 9/2006 | Grilli et al. | |
| 2007/0021148 A1 | 1/2007 | Mahini | |
| 2007/0040704 A1 | 2/2007 | Smee et al. | |
| 2007/0050189 A1 | 3/2007 | Cruz-Zeno et al. | |
| 2007/0086513 A1 | 4/2007 | Fernandez-Corbaton et al. | |
| 2007/0110095 A1 | 5/2007 | Attar et al. | |
| 2007/0112564 A1 | 5/2007 | Jelinek | |
| 2007/0133423 A1 | 6/2007 | Okumura | |
| 2007/0150787 A1 | 6/2007 | Kim et al. | |
| 2008/0019308 A1 | 1/2008 | Chuan-Lin et al. | |
| 2008/0080363 A1 | 4/2008 | Black et al. | |
| 2008/0080406 A1 | 4/2008 | Peplinski et al. | |
| 2008/0101440 A1 | 5/2008 | Lee | |
| 2009/0022098 A1 | 1/2009 | Novak et al. | |
| 2009/0232052 A1 | 9/2009 | Black et al. | |
| 2009/0252201 A1 | 10/2009 | Smee et al. | |
| 2009/0303968 A1 | 12/2009 | Jou et al. | |
| 2009/0303976 A1 | 12/2009 | Jou et al. | |
| 2009/0304024 A1 | 12/2009 | Jou et al. | |
| 2010/0097955 A1 | 4/2010 | Jou | |
| 2010/0142479 A1 | 6/2010 | Black et al. | |
| 2011/0264976 A1 | 10/2011 | Yang et al. | |
| 2012/0243515 A1 | 9/2012 | Xue et al. | |
| 2012/0281675 A1 | 11/2012 | Liang et al. | |

FOREIGN PATENT DOCUMENTS

| | | |
|---|---|---|
| CN | 1447549 A | 10/2003 |
| CN | 1552133 A | 12/2004 |
| CN | 1726657 A | 1/2006 |
| CN | 1758563 A | 4/2006 |
| CN | 1983913 A | 6/2007 |
| CN | 101465689 A | 6/2009 |
| CN | 101483499 A | 7/2009 |
| CN | 1891002 A | 10/2010 |
| EP | 1168703 A2 | 1/2002 |
| EP | 1199833 A2 | 4/2002 |
| EP | 1643737 A1 | 4/2006 |
| EP | 1677433 A1 | 7/2006 |
| EP | 1701565 A1 | 9/2006 |
| EP | 1703659 A2 | 9/2006 |
| EP | 1821497 A1 | 8/2007 |
| GB | 2337417 | 11/1999 |
| JP | 62239735 A | 10/1987 |
| JP | 10500811 | 1/1998 |
| JP | 2001036964 A | 2/2001 |
| JP | 2001078252 | 3/2001 |
| JP | 2001511963 A | 8/2001 |
| JP | 2001519113 | 10/2001 |
| JP | 2002009741 A | 1/2002 |
| JP | 2002506583 | 2/2002 |
| JP | 2002532008 T | 9/2002 |
| JP | 2002353824 | 12/2002 |
| JP | 2003518344 A | 6/2003 |
| JP | 2004502323 | 1/2004 |
| JP | 2004512733 A | 4/2004 |
| JP | 2004194288 A | 7/2004 |
| JP | 2004531975 | 10/2004 |
| JP | 2004343754 A | 12/2004 |
| JP | 2006501707 | 1/2006 |
| JP | 2006502622 A | 1/2006 |
| JP | 2007524269 A | 8/2007 |
| JP | 2007525103 A | 8/2007 |
| JP | 2008526136 A | 7/2008 |
| JP | 2009504097 A | 1/2009 |
| JP | 2005538650 | 12/2010 |
| KR | 20000052668 A | 8/2000 |
| KR | 20000071672 A | 11/2000 |
| KR | 20020092136 | 12/2002 |
| KR | 20030059528 A | 7/2003 |
| KR | 20040097893 A | 11/2004 |
| KR | 20040108813 | 12/2004 |
| KR | 20050073113 A | 7/2005 |
| KR | 20070091214 A | 9/2007 |
| KR | 20070104633 A | 10/2007 |
| KR | 20080031502 A | 4/2008 |
| KR | 20080039772 A | 5/2008 |
| RU | 2233045 C2 | 7/2004 |
| RU | 2323529 C2 | 4/2008 |
| WO | WO9526593 A2 | 10/1995 |
| WO | 9832231 A1 | 7/1998 |
| WO | WO9857452 A1 | 12/1998 |
| WO | 9923844 | 5/1999 |
| WO | WO99029048 | 6/1999 |
| WO | WO0033528 A1 | 6/2000 |
| WO | WO0035126 | 6/2000 |
| WO | WO0062456 | 10/2000 |
| WO | 0108324 | 2/2001 |

(56) References Cited

FOREIGN PATENT DOCUMENTS

| WO | 0117158 | 3/2001 |
|---|---|---|
| WO | WO0223792 A1 | 3/2002 |
| WO | 0233877 A1 | 4/2002 |
| WO | WO02103920 A2 | 12/2002 |
| WO | 03001834 A1 | 1/2003 |
| WO | WO03105370 A1 | 12/2003 |
| WO | WO2004025986 A2 | 3/2004 |
| WO | 2004032369 A2 | 4/2004 |
| WO | WO2004114582 A1 | 12/2004 |
| WO | 2005034383 A2 | 4/2005 |
| WO | 2006072088 A1 | 7/2006 |
| WO | WO2006071761 A1 | 7/2006 |
| WO | WO2007016553 | 2/2007 |
| WO | 2008027192 A2 | 3/2008 |
| WO | WO2008156061 A1 | 12/2008 |

OTHER PUBLICATIONS

International Search Report & Written Opinion—PCT/US2009/046708, International Search Authority—European Patent Office—Oct. 14, 2009.

International Search Report & Written Opinion—PCT/US2009/046717, International Search Authority—European Patent Office—Oct. 7, 2009.

International Search Report & Written Opinion—PCT/US2009/046720, International Search Authority—European Patent Office—Nov. 27, 2009.

International Search Report and Written Opinion—PCT/US2009/034637, International Search Authority—European Patent Office—Jul. 14, 2009.

International Search Report and Written Opinion—PCT/US2009/060383, International Search Authority—European Patent Office—Mar. 29, 2010.

International Search Report and Written Opinion—PCT/US2010/049690, ISA/EPO—May 6, 2011.

Partial International Search Report and Written Opinion—PCT/US2010/049690, International Search Authority—European Patent Office—Mar. 11, 2011.

3rd Generation Partnership, Project 2 "3GPP2" Physical Layer Standard for cdma2000,Spread Spectrum Systems. Revision D, 3GPP2 C.S0002-D, Version 2.0, Sep. 30, 2005 (538 pages).

Written Opinion—PCT/US2010/049702, International Search Authority—European Patent Office—Mar. 17, 2011.

Chen, B.Y., et al., "Using H.264 Coded Block Patterns for Fast Inter-Mode Selection" Multimedia and Expo, 2008 IEEE International Conference on, IEEE, Piscataway, NJ, USA, Jun. 23, 2008, pp. 721-724, XP031312823 ISBN: 978-1-4244-2570-9.

JVT: "Draft ITU-T Recommendation and Final Draft International Standard of Joint Video Specification (ITU-T Rec. H .264 ISO/IEC 14496-10 AVC)", 7. JVT Meeting; 64. MPEG Meeting; Mar. 7, 2003-Mar. 14, 2003; Pattaya, TH; (Joint Video Team of ISO/IEC JTC1/SC29/WG11 and ITU-T 56.16 ), No. JVT-G050r1, Mar. 14, 2003, XP030005712, ISSN: 0000-0427.

* cited by examiner

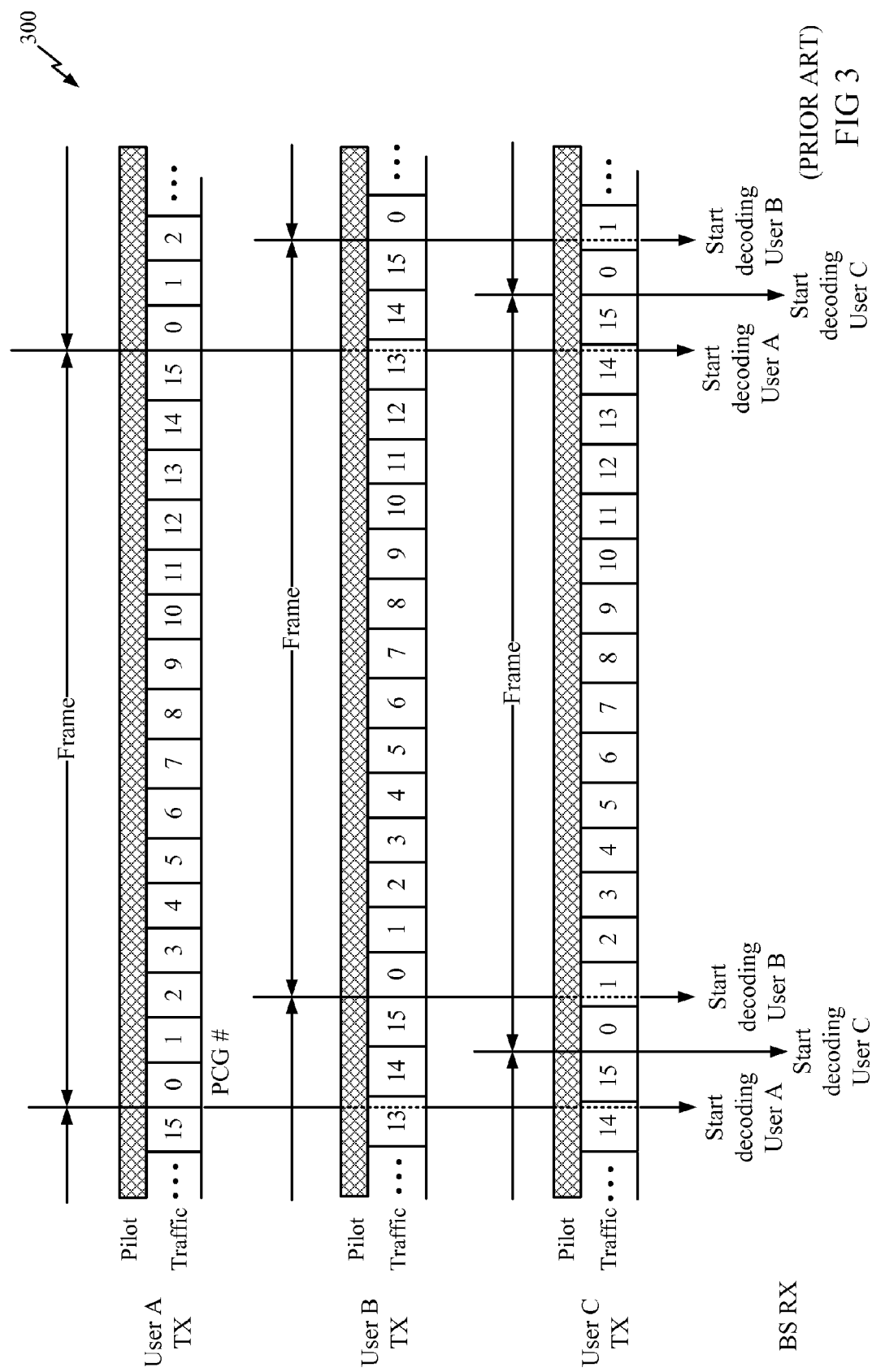

INTERFERENCE CANCELLATION FOR WIRELESS COMMUNICATIONS

RELATED APPLICATIONS

This application is a continuation-in-part of U.S. patent application Ser. No. 12/424,050, entitled "Increasing Capacity in Wireless Communications," filed Apr. 15, 2009, which claims priority to U.S. Provisional App. Ser. No. 61/060,119, entitled "Apparatus and Methods for Increasing Capacity in Wireless Communications," filed Jun. 9, 2008, and U.S. Provisional App. Ser. No. 61/060,408, entitled "Apparatus and Methods for Increasing Capacity in Wireless Communications," filed Jun. 10, 2008, and U.S. Provisional App. Ser. No. 61/061,546, entitled "Apparatus and Methods for Increasing Capacity in Wireless Communications," filed Jun. 13, 2008, the contents of which are hereby incorporated by reference in their entirety. U.S. patent application Ser. No. 12/424,050 is also a continuation-in-part of U.S. patent application Ser. No. 12/389,211, entitled "Frame Termination," filed Feb. 19, 2009, which claims priority to U.S. Provisional Application No. 61/030,215, filed Feb. 20, 2008, the contents of which are hereby incorporated by reference in their entirety.

This application is also a continuation-in-part of U.S. patent application Ser. No. 12/484,572, entitled "Pilot Interference Cancellation," filed Jun. 15, 2009, which is a continuation-in-part of U.S. patent application Ser. No. 11/334,977, entitled "Reverse Link Interference Cancellation," filed Jan. 18, 2006, which claims priority to U.S. Provisional App. Ser. Nos. 60/710,405, entitled "A method to remove reverse link inter-cell interference," filed on Aug. 22, 2005; 60/713,549, entitled "Reverse link inter-cell interference cancellation," filed on Aug. 31, 2005; 60/710,370, entitled "A method of interference cancellation," filed on Aug. 22, 2005; and 60/713,517, entitled "System with multiple signal receiving units and a central processor with interference cancellation," filed on Aug. 31, 2005, assigned to the assignee of the present application, the contents of which are hereby incorporated herein by reference in their entirety.

This application is related to U.S. patent application Ser. No. 12/252,544, entitled "Rate Determination," filed Oct. 16, 2008, assigned to the assignee of the present application, the contents of which are hereby incorporated by reference in their entirety.

TECHNICAL FIELD

The present invention relates generally to digital communications, and more specifically, to techniques for improving the capacity of wireless digital communications systems by using interference cancellation.

BACKGROUND

Wireless communications systems are widely deployed to provide various types of communication such as voice, packet data, and so on. These systems may be based on code division multiple access (CDMA), time division multiple access (TDMA), frequency division multiple access (FDMA), or other multiple access techniques. Such systems can conform to standards such as Third-Generation Partnership Project 2 (3gpp2, or "cdma2000"), Third-Generation Partnership (3gpp, or "W-CDMA"), or Long Term Evolution ("LTE"). In the design of such communications systems, it is desirable to maximize the capacity, or the number of users the system can reliably support, given the available resources.

In an aspect of a wireless communications system, transmissions between two units often employ a degree of redundancy to guard against errors in the received signals. For example, on a reverse link (RL) transmission from an access terminal (AT) to a base station (BS) in a cdma2000 wireless communications system, redundancies such as fractional-rate symbol encoding and symbol repetition may be employed. In a cdma2000 system, encoded symbols are grouped into sub-segments known as power control groups (PCG's) and transmitted over the air, with a fixed number of PCG's defining a frame.

While signal redundancy such as that employed in cdma2000 may allow accurate recovery of transmitted signals in the presence of noise, such redundancy may cause unnecessary interference to other users of the wireless communications system, e.g., to other AT's communicating with the BS on other reverse links. This interference may undesirably decrease the system capacity.

It would be desirable to provide techniques to improve the efficiency of digital communications systems employing redundancy.

In a further aspect of a wireless communications system, transmissions between two units may include a traffic signal and a pilot signal having known data content. While the pilot signal may aid the receiver, e.g., a BS, in recovering data from the traffic signal, the pilot signal sent by one AT may undesirably cause interference to the traffic and pilot signals sent by other AT's to the BS. It would be desirable to provide techniques to improve the accuracy of demodulating and decoding traffic signals in the presence of pilot interference.

SUMMARY

An aspect of the present disclosure provides a method for recovering data from a received signal comprising a first user pilot and an interference signal, the method comprising: estimating the pilot from the received signal to generate a first-pass pilot estimate; cancelling the first-pass pilot estimate from the received signal to generate a first cancelled signal; estimating the interference signal from the first cancelled signal to generate an interference estimate; cancelling the interference estimate from the first cancelled signal to generate an interference-cancelled signal; re-estimating the pilot from the interference-cancelled signal to generate a second pilot estimate; and demodulating a signal derived from the received signal using the second pilot estimate to recover data from the received signal.

Another aspect of the present disclosure provides a method for recovering data from a received signal comprising a first user pilot and an interference signal, the method comprising: estimating the first user pilot from the received signal to generate a first-pass pilot estimate; cancelling the first-pass pilot estimate from the received signal to generate a first cancelled signal; re-estimating the first user pilot from a signal derived from the first cancelled signal to generate a second pilot estimate; demodulating a signal derived from the received signal using the second pilot estimate to recover data of the first user from the received signal; and if the data is successfully recovered: reconstructing the first user pilot based on the successfully decoded data, and cancelling the reconstructed first user pilot from the received signal.

Yet another aspect of the present disclosure provides an apparatus for recovering data from a received signal comprising a first user pilot and an interference signal, the apparatus comprising: a first-pass and residual pilot estimation/reconstruction block configured to: generate a first-pass estimate of the first user pilot; cancel the first-pass estimate from the received signal to generate a first cancelled signal; estimate the interference signal from the first cancelled signal to generate an interference estimate; cancel the interference estimate from the first cancelled signal to generate an interference-cancelled signal; and generate a second estimate of the first user pilot by re-estimating the pilot of the first user from the interference-cancelled signal; and a demodulator configured to demodulate a signal derived from the received signal using a second estimate of the first user pilot to recover data of the first user from the received signal.

Yet another aspect of the present disclosure provides an apparatus for recovering data from a received signal comprising a first user pilot and an interference signal, the apparatus comprising: a first-pass and residual pilot estimation/reconstruction block configured to: generate a first-pass estimate of the first user pilot; cancel the first-pass estimate from the received signal to generate a first cancelled signal; and re-estimate the first user pilot from a signal derived from the first cancelled signal to generate a second pilot estimate; and a demodulator configured to demodulate a signal derived from the received signal using the second pilot estimate to recover first user data from the received signal; and the first-pass and residual pilot estimation/reconstruction block further configured to, if the data is successfully recovered: reconstruct the first user pilot based on the successfully decoded data, and cancel the reconstructed first user pilot from the received signal.

Yet another aspect of the present disclosure provides an apparatus for recovering data from a received signal comprising a first user pilot and an interference signal, the apparatus comprising: means for performing first-pass pilot interference cancellation of a first user's pilot on the received signal to generate a first cancelled signal; means for estimating and cancelling the interference signal from the first cancelled signal to generate an interference-cancelled signal; and means for demodulating a signal derived from the received signal using a re-estimated first user pilot to recover first user data from the received signal.

Yet another aspect of the present disclosure provides an apparatus for recovering data from a received signal comprising a first user pilot and an interference signal, the apparatus comprising: means for performing first-pass pilot interference cancellation of a first user's pilot on the received signal to generate a first cancelled signal; means for demodulating a signal derived from the received signal using a re-estimated first user pilot to generate a second pilot estimate to recover data of the first user from the received signal; and means for, if the data is successfully recovered: reconstructing the first user pilot based on the successfully decoded data, and cancelling the reconstructed first user pilot from the received signal.

Yet another aspect of the present disclosure provides a computer program product for recovering data from a received signal comprising a first user pilot and an interference signal, the product comprising: computer-readable medium comprising: code for causing a computer to perform first-pass pilot interference cancellation of a first user's pilot on the received signal to generate a first cancelled signal; code for causing a computer to estimate and cancel the interference signal from the first cancelled signal to generate an interference-cancelled signal; and code for causing a computer to demodulate a signal derived from the received signal using a re-estimated first user pilot to recover first user data from the received signal.

Yet another aspect of the present disclosure provides a computer program product for recovering data from a received signal comprising a first user pilot and an interference signal, the product comprising: computer-readable medium comprising: code for causing a computer to perform first-pass pilot interference cancellation of a first user's pilot on the received signal to generate a first cancelled signal; code for causing a computer to demodulate a signal derived from the received signal using a re-estimated first user pilot to generate a second pilot estimate to recover data of the first user from the received signal; and code for causing a computer to, if the data is successfully recovered: reconstruct the first user pilot based on the successfully decoded data, and cancel the reconstructed first user pilot from the received signal.

BRIEF DESCRIPTION OF DRAWINGS

FIG. 3 illustrates example channels transmitted by multiple users to a base station in a CDMA communications system.

DETAILED DESCRIPTION

The detailed description set forth below in connection with the appended drawings is intended as a description of exemplary embodiments of the present invention and is not intended to represent the only exemplary embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well known structures and devices are shown in block diagram form in order to avoid obscuring the novelty of the exemplary embodiments presented herein.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Figure 1:
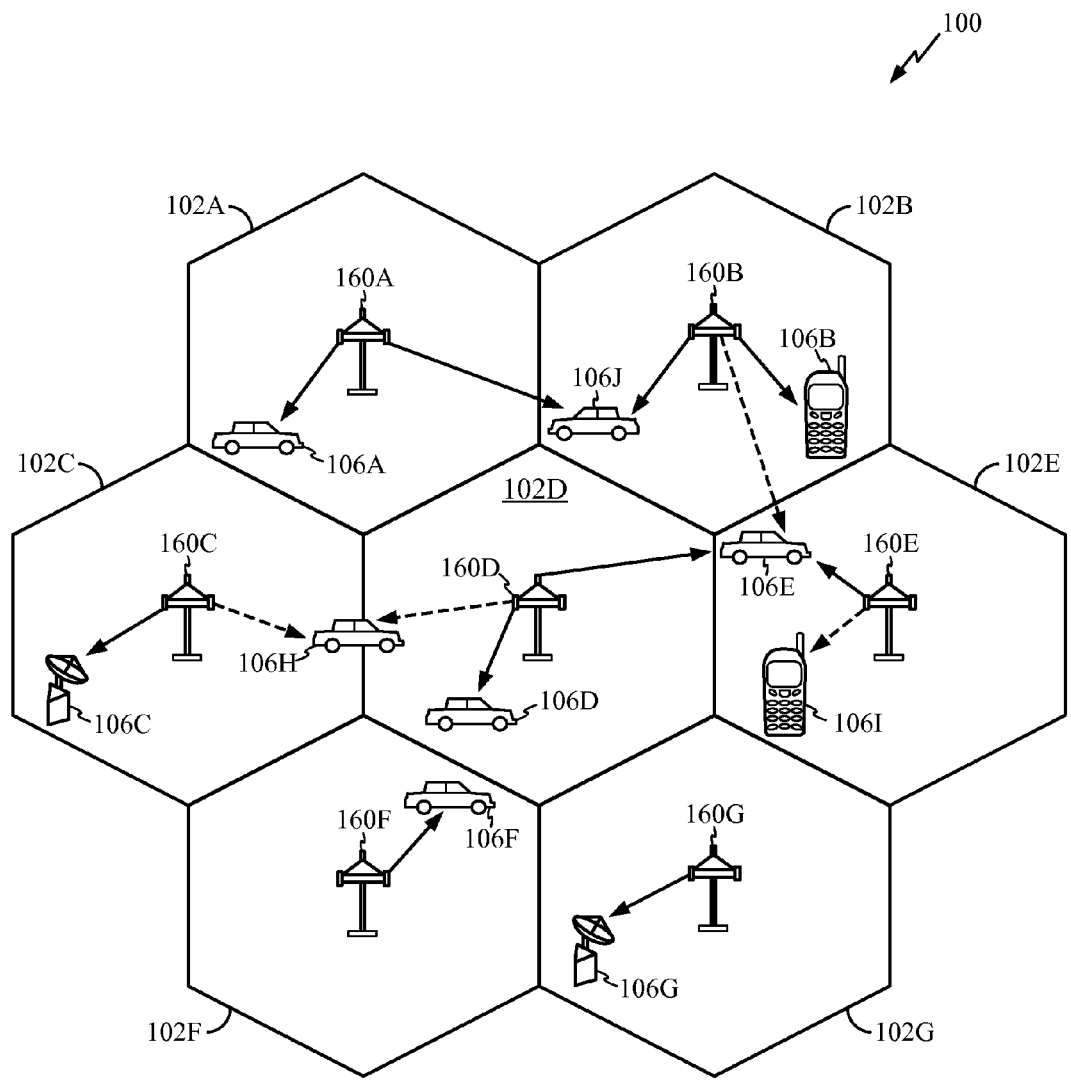
FIG. 1 illustrates a prior art wireless communications system.

FIG. 1 illustrates a prior art wireless cellular communications system 100 wherein reference numerals 102A to 102G refer to cells, reference numerals 160A to 160G refer to base stations, and reference numerals 106A to 106G refer to access terminals (AT's). A communications channel includes a forward link (FL) (also known as a downlink) for transmissions from the base station (BS) 160 to the access terminal (AT) 106, and a reverse link (RL) (also known as an uplink) for transmissions from the AT 106 to the BS 160. The AT 106 is also known as a remote station, a mobile station, a subscriber station, or simply a user. The access terminal (AT) 106 may be mobile or stationary. Each link may incorporate a different number of carrier frequencies. Furthermore, an access terminal 106 may be any data device that communicates through a wireless channel or through a wired channel, for example using fiber optic or coaxial cables. An access terminal 106 may further be any of a number of types of devices including but not limited to PC card, compact flash, external or internal modem, or wireless or wireline phone.

Modern communications systems are designed to allow multiple users to access a common communications medium using a particular channel allocation methodology. Numerous multiple-access techniques are known in the art, such as time division multiple-access (TDMA), frequency division multiple-access (FDMA), space division multiple-access, polarization division multiple-access, code division multiple-access (CDMA), and other similar multi-access techniques. The channel allocations can take on various forms depending on the specific multi-access technique. For example, in FDMA systems, the total frequency spectrum is divided into a number of smaller sub-bands, and each user is given its own sub-band to access the communications link. Alternatively, in TDMA systems, each user is given the entire frequency spectrum during periodically recurring time slots. In CDMA systems, each user is given the entire frequency spectrum for all of the time but distinguishes its transmission through the use of a code.

In certain implementations of the communications system 100, the AT may be in a situation known as soft handoff, e.g., wherein an AT communicates simultaneously with multiple BS's on the forward and/or reverse link. For example, AT 106J is shown in soft handoff between two BS's 160A and 160B. The reverse link transmissions by the AT may be received at each of the two BS's, either or both of which may transmit a power control (PC) command back to the AT to adjust the AT transmission power.

In certain implementations, the BS's 160C and 160D may be base transceiver stations (BTS's) further communicating with a base station controller (BSC) (not shown) or radio network controller (RNC). The BSC may, e.g., handle allocation of radio channels amongst the AT's, measurements of channel quality from the AT's, control handovers from BTS to BTS, etc.

While certain exemplary embodiments of the present disclosure may be described hereinbelow for operation according to the cdma2000 standard, one of ordinary skill in the art will appreciate that the techniques may readily be applied to other digital communications systems with corresponding modifications. For example, the techniques of the present disclosure may also be applied to systems based on the W-CDMA (or 3gpp, or UMTS) wireless communications standard, and/or any other communications standards. Furthermore, while certain exemplary embodiments of the present disclosure may be described hereinbelow for operation on a reverse link of a wireless communications system, one of ordinary skill in the art will appreciate that the techniques need not be restricted to the reverse link of a wireless communications system. For example, a "user" as used herein may specifically denote an AT communicating with a BS on a reverse link, but may also generally denote any communications unit communicating with any other unit over a communications link. Such alternative exemplary embodiments are contemplated to be within the scope of the present disclosure.

Figure 2:
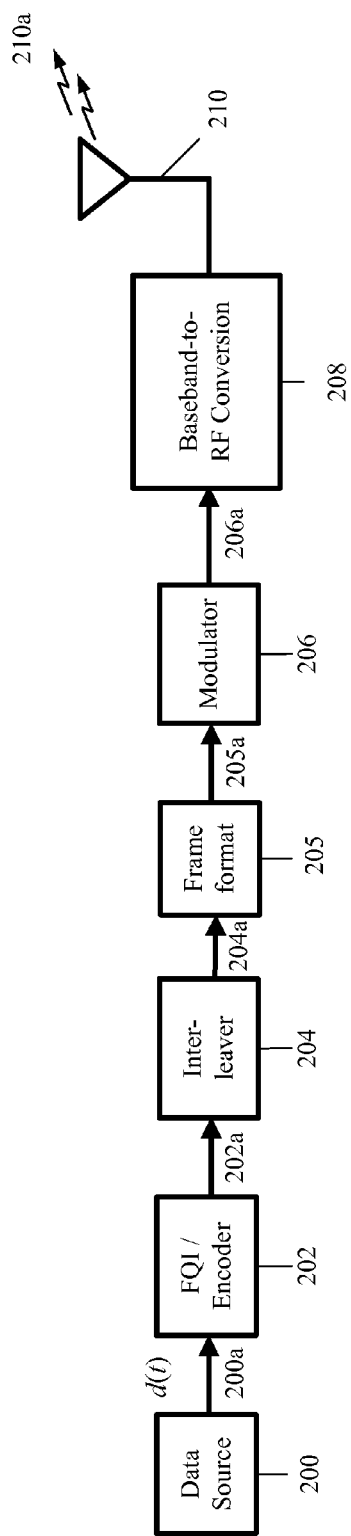
FIG. 2 illustrates an example of a prior art transmitter structure and/or process, which may be implemented, e.g., at an access terminal of FIG. 1.
Figure 2A:
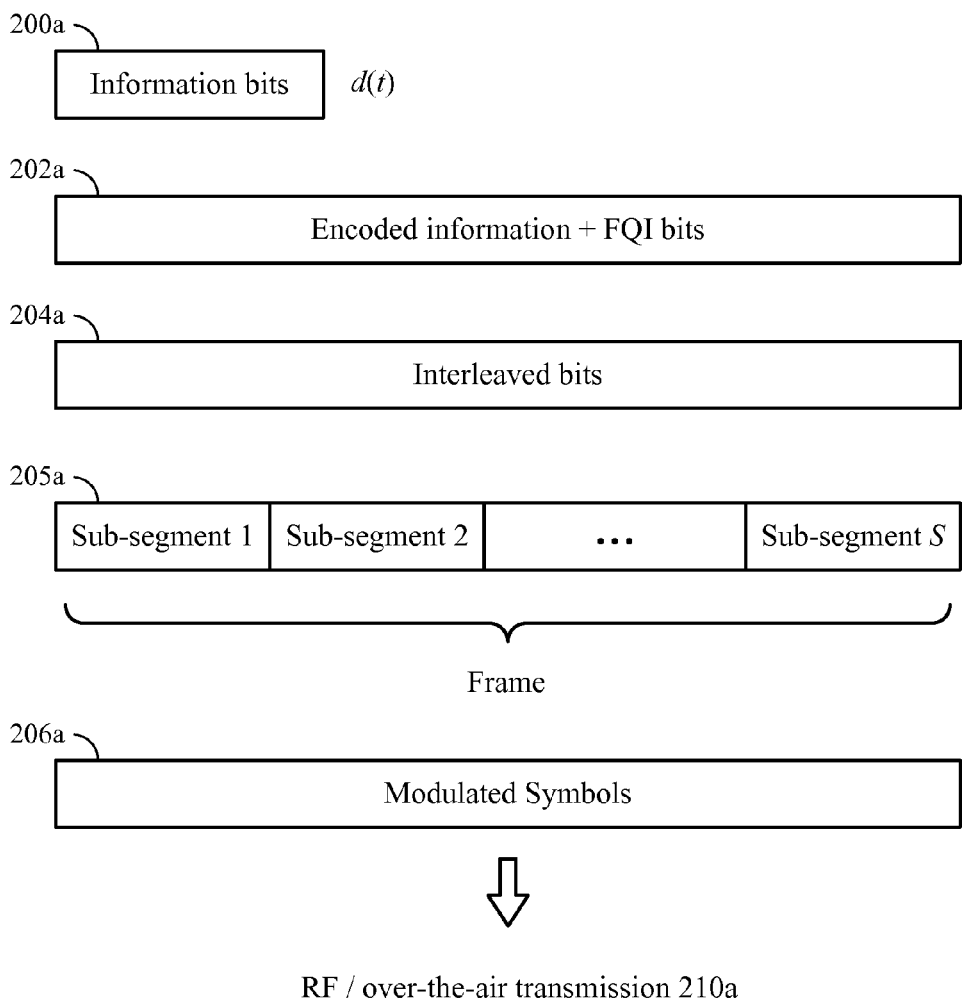
FIG. 2A illustrates the status of the data processed by the operational blocks illustrated in FIG. 2.

FIG. 2 illustrates an example of a prior art transmitter structure and/or process, which may be implemented, e.g., at an access terminal 106 of FIG. 1. The functions and components shown in FIG. 2 may be implemented by software, hardware, or a combination of software and hardware. Other functions may be added to FIG. 2 in addition to or instead of the functions shown in FIG. 2. FIG. 2A illustrates the status of the data processed by the operational blocks illustrated in FIG. 2.

In FIG. 2, a data source 200 provides data d(t) or 200a to an FQI/encoder 202. The FQI/encoder 202 may append a frame quality indicator (FQI) such as cyclic redundancy check (CRC) to the data d(t). The FQI/encoder 202 may further encode the data and FQI using one or more coding schemes to provide encoded symbols 202a. Each coding scheme may include one or more types of coding, e.g., convolutional coding, Turbo coding, block coding, repetition coding, other types of coding, or no coding at all. Other coding schemes may include automatic repeat request (ARQ), hybrid ARQ (H-ARQ), and incremental redundancy repeat techniques. Different types of data may be encoded with different coding schemes. The encoded information and FQI are also shown in FIG. 2A as 202a.

An interleaver 204 interleaves the encoded data symbols 202a in time to combat fading, and generates symbols 204a. The interleaved symbols of signal 204a may be mapped by a frame format block 205 to a pre-defined frame format to produce a frame 205a. In an implementation, a frame format may specify the frame as being composed of a plurality of sub-segments. In an implementation, sub-segments may be any successive portions of a frame along a given dimension, e.g., time, frequency, code, or any other dimension. A frame may be composed of a fixed plurality of such sub-segments, each sub-segment containing a portion of the total number of symbols allocated to the frame. For example, in an exemplary embodiment according to the W-CDMA standard, a sub-segment may be defined as a slot. In an implementation according to the cdma2000 standard, a sub-segment may be defined as a power control group (PCG). For example, FIG. 2A illustrates that the interleaved symbols 204a are segmented into a plurality S of sub-segments making up a frame 205a.

In certain implementations, a frame format may further specify the inclusion of, e.g., control symbols (not shown) along with the interleaved symbols 204a. Such control symbols may include, e.g., power control symbols, frame format information symbols, etc.

A modulator 206 modulates the frame 205a to generate modulated data 206a. Examples of modulation techniques include binary phase shift keying (BPSK) and quadrature phase shift keying (QPSK). The modulator 206 may also repeat a sequence of modulated data. The modulator 206 may also spread the modulated data with a Walsh cover (i.e., Walsh code) to form a stream of chips. The modulator 206 may also use a pseudo random noise (PN) spreader to spread the stream of chips with one or more PN codes (e.g., short code, long code).

A baseband-to-radio-frequency (RF) conversion block 208 may convert the modulated signal 206a to RF signals for transmission via an antenna 210 as signal 210a over a wireless communication link to one or more base station receivers.

FIG. 3 illustrates example channels 300 transmitted by multiple users to a base station in a CDMA communications system. Note the exemplary channels and users are shown for illustrative purposes only, and are not meant to restrict the scope of the present disclosure to any particular configuration of channels or users shown.

In FIG. 3, User A, User B, and User C are shown transmitting to a single base station (BS). Transmissions (TX) from each user include a pilot signal and a traffic signal. In some implementations, the pilot signal for each user is multiplexed onto a separate code from the traffic to allow the receiver (e.g., a base station) to separate the pilot from the traffic. The pilot may be alternatively or further multiplexed using other channelization schemes, e.g., pilot and traffic may be modulated onto separate quadrature-phase (e.g., I and Q) carriers. The pilot may contain, e.g., a transmitted sequence whose signal content is known a priori by the receiver, to aid the receiver in, e.g., demodulating the corresponding traffic data. Note as used in this specification and in the claims, the term "traffic" is inclusive of any channel whose data content is not known a priori by the receiver. Thus the term "traffic" may encompass both data associated with voice traffic in cdma2000 systems, as well as data associated with "overhead channels" such as ACK messages, power control messages, etc.

In FIG. 3, the traffic signal from each user is further formatted into a plurality of frames in time, with each frame being further formatted into a plurality (e.g., 16) of sub-segments or "power control groups" (PCG's). Note as shown in FIG. 3, the start and stop times of a frame transmitted by any user generally need not coincide with the start and stop times of frames transmitted by other users.

At the BS, a composite signal containing the sum of the pilot and traffic signals for all users is received and processed to recover the data transmitted by each user. In a prior art technique indicated in FIG. 3, a BS starts decoding a frame only upon receiving all PCG's corresponding to that frame. For example, the BS starts decoding User A's frame only after receiving PCG #15 from User A, and similarly for User B and User C.

Figure 4:
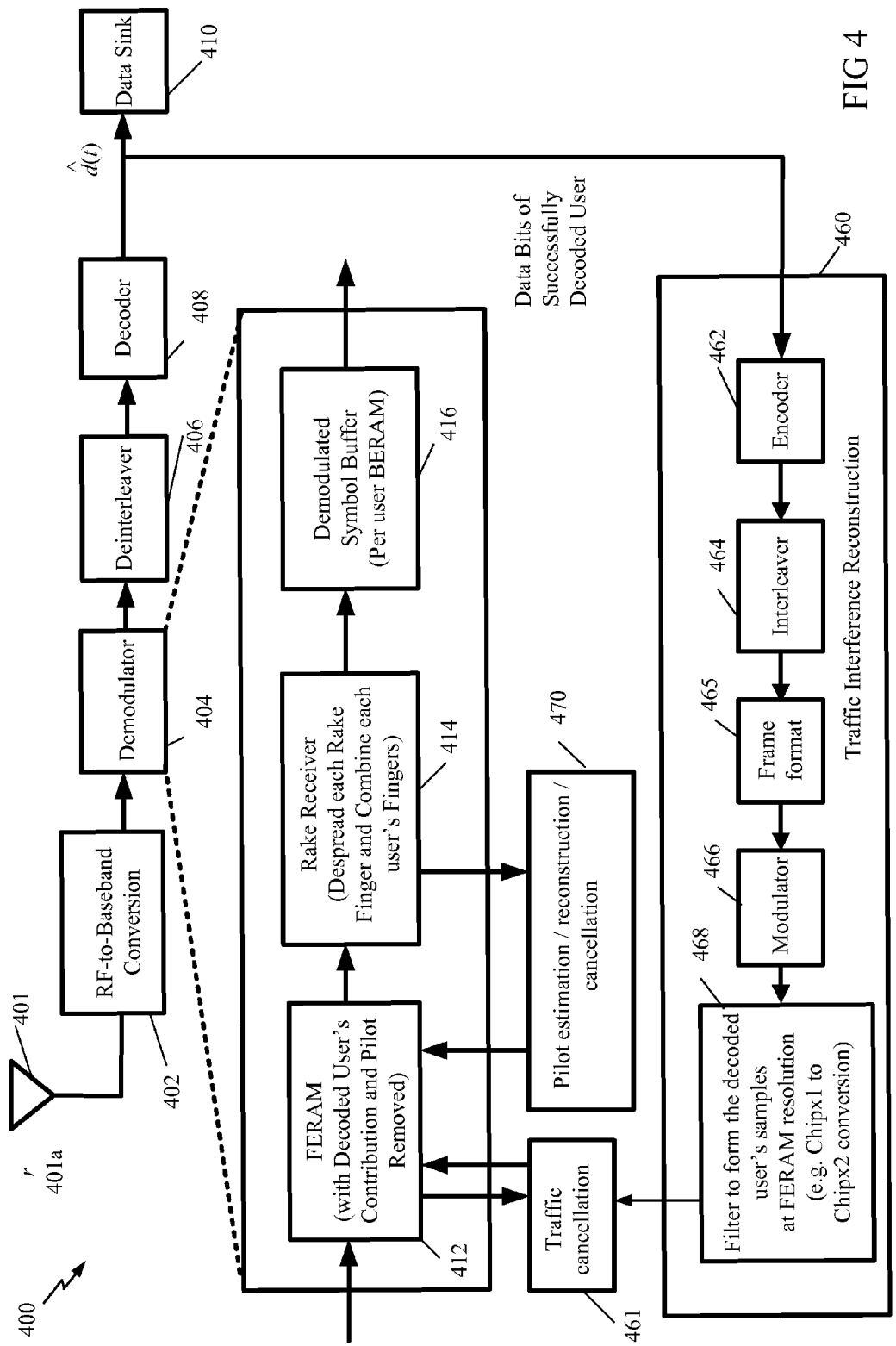
FIG. 4 illustrates a receiver which may be implemented at a base station to receive and process the signals transmitted by the users.

FIG. 4 illustrates a receiver 400 which may be implemented at a base station to receive and process the signals transmitted by the users. The functions and components shown in FIG. 4 may be implemented by software, hardware, or a combination of software and hardware. Other functions may be added to FIG. 4 in addition to or instead of the functions shown in FIG. 4. Although interference cancellation at a base station is described below, the concepts herein may be readily applied to a user or any other component of a communication system.

In FIG. 4, one or more antennas 401 receive a composite signal r 401a from all users. For example, r may correspond to the sum of all users' transmitted pilot and traffic signals, as earlier described with reference to FIG. 3. The received signal r 401a is provided to an RF-to-baseband conversion block 402, which may condition (e.g., filters, amplifies, downconverts) and digitize the received signal to generate digital samples.

A demodulator 404 may demodulate the received signal to provide recovered symbols for each user. For cdma2000, demodulation tries to recover a data transmission by (1) channelizing the despread samples to isolate the received pilot and traffic onto their respective code channels, and (2) coherently demodulating the channelized traffic with a recovered pilot to provide demodulated data. Demodulator 404 may include a received sample buffer 412 (also called joint front-end RAM, FERAM, or sample RAM) to store samples of the composite signal r received for all users, a Rake receiver 414 to despread and process multiple signal instances corresponding to distinct multipaths and/or users, and a demodulated symbol buffer 416 (also called back-end RAM, BERAM, or demodulated symbol RAM). Note there may be a plurality of demodulated symbol buffers 416, each corresponding to a particular user.

A deinterleaver 406 deinterleaves data from the demodulator 404.

A decoder 408 may decode the demodulated data to recover decoded data bits $\hat{d}(t)$. The decoded data $\hat{d}(t)$ may be provided to a data sink 410.

In FIG. 4, decoded data bits $\hat{d}(t)$ are further shown input to an interference reconstruction block 460 to reconstruct a decoded user's contribution to the composite signal r stored in FERAM. The block 460 includes an encoder 462, interleaver 464, a frame format block 465, and a modulator 466 for reconstructing a replica of the signal originally transmitted by the user, e.g., according to the operations illustrated in FIG. 2. The block 460 further includes a filter 468 which forms the received user's samples at FERAM resolution, e.g., at 2× chip rate. In an exemplary embodiment, the gain of the filter 468 may be weighted with a channel estimate as derived from channel estimation techniques known in the art. The decoded user's contribution to the FERAM is then removed or canceled from the FERAM 412 using traffic cancellation block 461, in the process known as traffic interference cancellation (TIC).

As further shown in FIG. 4, a pilot estimation/reconstruction block 470 for performing pilot interference cancellation (PIC) is provided. Block 470 may cancel users' pilot signals from the samples in the FERAM 412, so that demodulation and decoding of each user's traffic signal may proceed without interference from the pilot signal of that user and other users. Techniques for performing PIC are disclosed in, e.g., U.S. patent application Ser. No. 12/484,572, earlier referenced herein.

Further description is given below of the functions of the FERAM 412 and BERAM 416 in the receiver 400.

In an exemplary embodiment, the FERAM 412 and the BERAM 416 may be circular buffers. The FERAM 412 stores received samples (e.g., at 2× chip rate) and is common to all users. The BERAM 416 stores demodulated symbols of the received signal as generated by the demodulator's Rake receivers 414. Each user may have a different BERAM, since the demodulated symbols are obtained by despreading with the user-specific PN sequence, and combining across Rake fingers. In an exemplary embodiment, each Rake finger may estimate its own corresponding pilot, and when an estimated pilot is subsequently cancelled from the FERAM using PIC techniques known in the art, it may be cancelled using the offset of the corresponding Rake finger that derived that estimated pilot.

Figure 5:
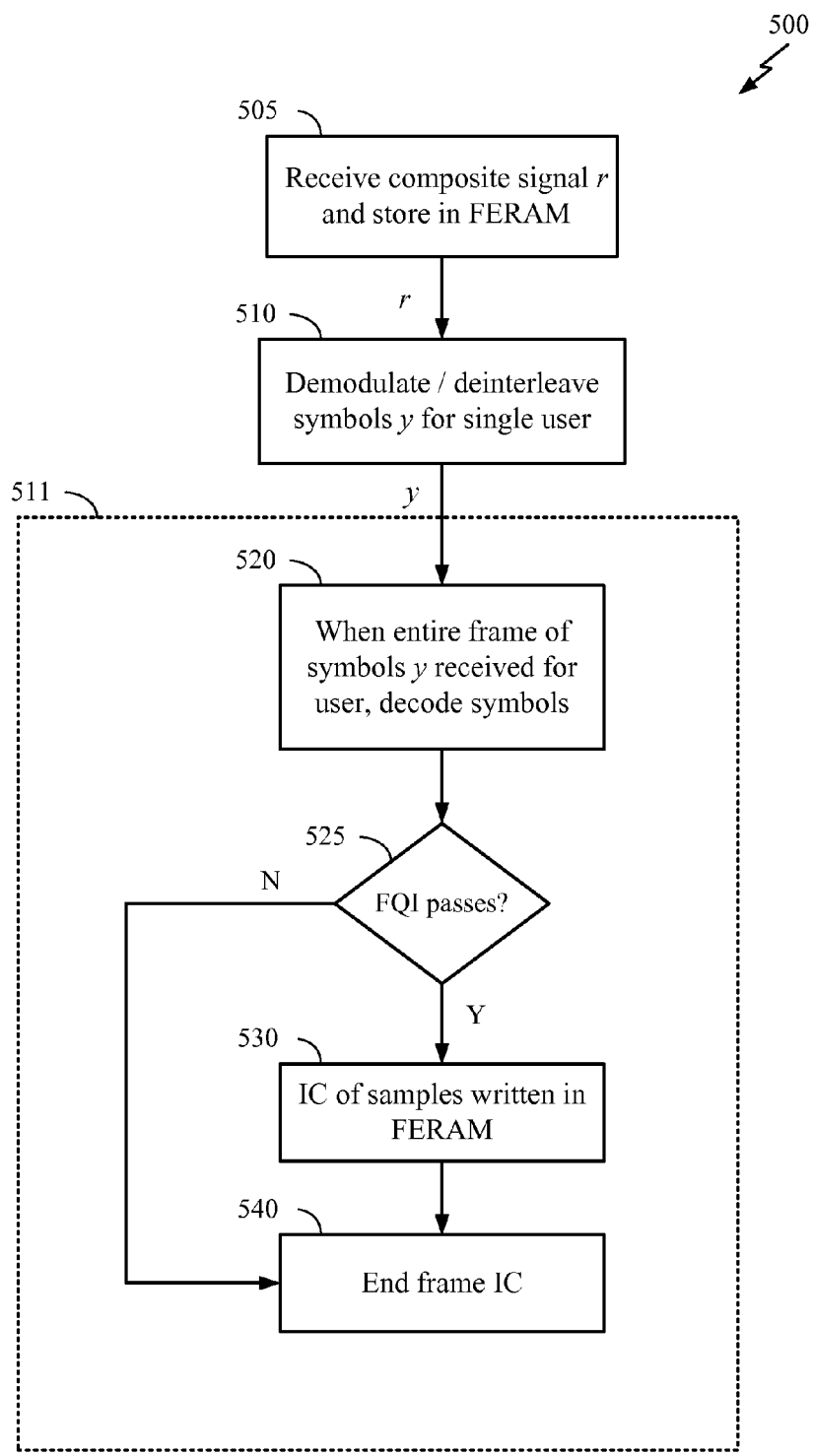
FIG. 5 illustrates an exemplary embodiment of a method for interference cancellation of a user's frame from the composite signal r.

FIG. 5 illustrates an exemplary embodiment of a method 500 for interference cancellation of a user's frame from the composite signal r.

At block 505, the composite signal r is received and stored in the FERAM.

At block 510, the signal r is demodulated for a single user and deinterleaved to produce symbols y, which are stored in a BERAM.

At block 520, the symbols y are decoded when an entire frame, i.e., including all PCG's, is received for a user.

At block 525, it is determined whether the FQI, e.g., as appended by the FQI/encoder block 202 in FIG. 2, passes. If yes, the method proceeds to block 530. If no, the method proceeds to block 540. Note in some exemplary embodiments, a FQI need not be one explicitly appended to a frame at the transmitter, and may instead include, e.g., an energy metric or other metric of the received frame.

At block 530, interference cancellation (IC) is performed on the signal stored in the FERAM. For example, as described earlier with reference to FIG. 4, decoded data bits $\hat{d}(t)$ of a successfully decoded frame are input to an interference reconstruction block, and a reconstructed traffic signal may be cancelled from the FERAM. The cancelled interference from the FERAM may, e.g., improve the likelihood of successfully decoding another user's frame.

At block 540, IC is ended for the frame.

One of ordinary skill in the art will appreciate that while the operations collectively denoted by block 511 (i.e., blocks 520-540) are shown as applied to a single frame for a single user, it will be understood that multiple instances of block 511 may be readily executed to process multiple frames for multiple users to perform IC on a composite signal r.

In an aspect of the present disclosure, techniques for combining interference cancellation with early decoding are described, wherein decoding data bits d(t) of a frame for a user is attempted prior to receiving the entire frame. Mechanisms for early decoding are further described in, e.g., U.S. patent application Ser. No. 12/252,544, earlier referenced herein.

Figure 6:
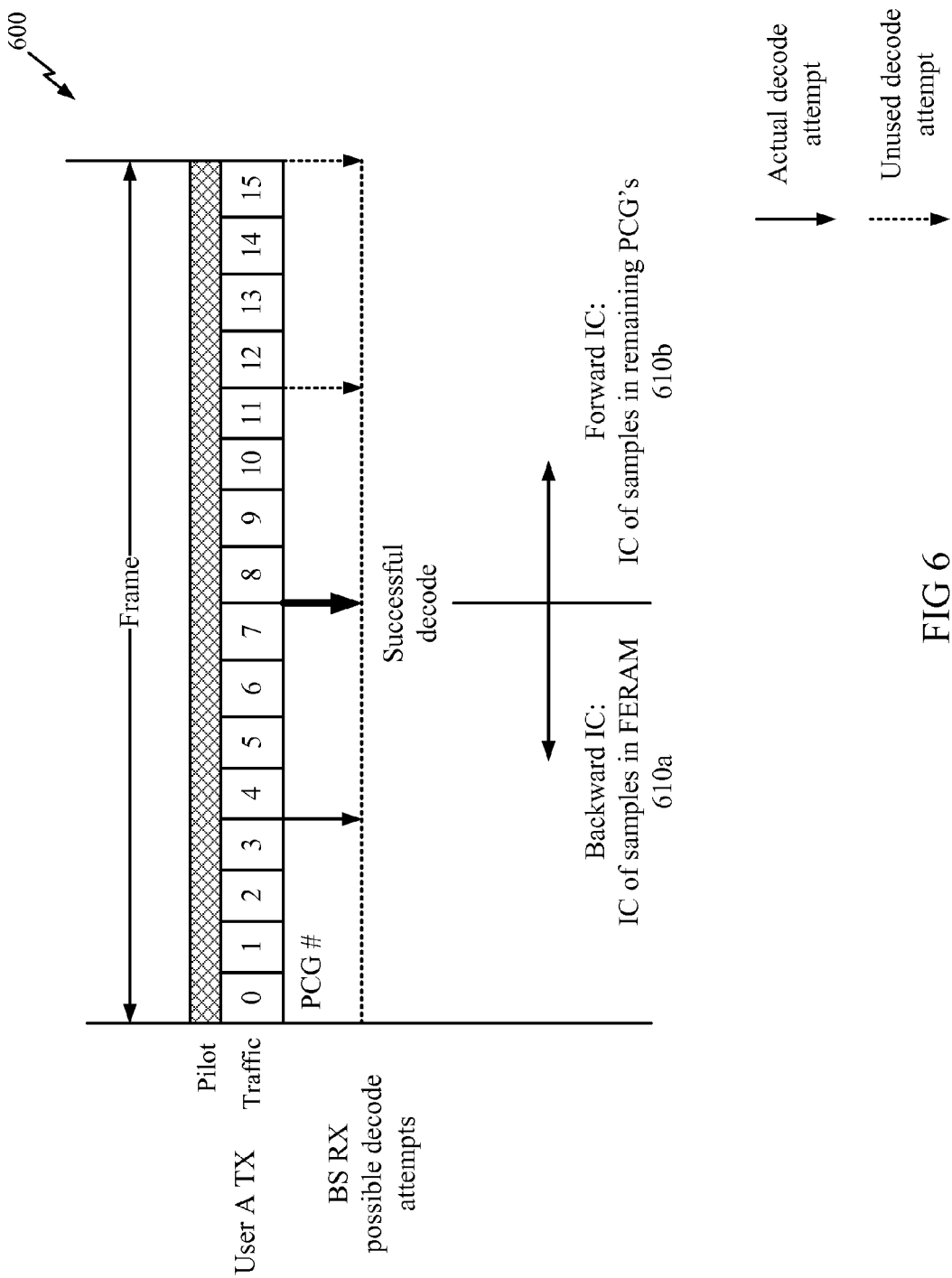
FIG. 6 illustrates an exemplary timing diagram of early decoding and interference cancellation (IC) techniques according to the present disclosure.

FIG. 6 illustrates an exemplary timing diagram 600 of exemplary early decoding and interference cancellation (IC) techniques according to the present disclosure. Note the timing diagram 600 is shown for illustrative purposes only, and is not meant to limit the scope of the present disclosure to any particular parameters shown herein. One of ordinary skill in the art will also appreciate that specific PCG numbers referred to herein are for illustrative purposes only, and are not meant to limit the scope of the present disclosure.

In FIG. 6, User A transmits a frame comprising a plurality of PCG's on a reverse link to a BS. The BS receives the PCG's as they are transmitted by User A, and attempts decoding of the frame prior to receiving all PCG's associated with the frame, i.e., according to early decoding techniques. In FIG. 6, possible decode attempts occur once every four PCG's, e.g., after receiving PCG #3, after receiving PCG #7, after receiving PCG #11, and after receiving PCG #15. One of ordinary skill in the art will appreciate that early decode attempts may occur at intervals other than once every four PCG's, and such alternative exemplary embodiments are contemplated to be within the scope of the present disclosure.

In the example shown, a decode attempt after receiving PCG #7 results in a successful decode, whereupon the data bits $\hat{d}(t)$ corresponding to the entire frame are known by the BS. Following successful decode of the frame, both backward IC 610a and forward IC 610b may be performed according to the present disclosure.

In an exemplary embodiment, backward IC 610a includes reconstructing the traffic signal contained in the PCG's received prior to successful decoding (i.e., PCG#'s 0 through 7 in FIG. 6), and cancelling the reconstructed signal from the FERAM. The backward IC 610a may benefit the decoding of other users' traffic signals by, e.g., removing from the signals stored in FERAM the interference associated with the PCG's of the successfully decoded user.

In an exemplary embodiment, forward IC 610b includes reconstructing the traffic signal in the PCG's yet to be received for the successfully decoded frame (e.g., PCG#'s 8 through 15 in FIG. 6) using the data bits $\hat{d}(t)$, and cancelling the reconstructed signal from the composite signal r. Like backward IC 610a, forward IC 610b also benefits the decoding of other users' traffic signals, with the additional advantage that there need be no latency associated with first demodulating and decoding a user's signal in r for forward cancellation. In an exemplary embodiment, forward IC 610b may be performed simultaneously with pilot interference cancellation (PIC) for the remaining PCG's, e.g., prior to demodulation of any traffic channels.

In an exemplary embodiment, a reverse link transmission (e.g., a traffic signal) by User A to the base station may be defined as a first channel, while another user's transmission (not shown) to the same base station may be defined as a second channel. It will be appreciated that cancelling the first channel using the backward and forward IC techniques described hereinabove may advantageously benefit decoding of the second channel at the base station. In the case of forward IC, such cancelling of the first channel may be done, e.g., using a generated expected receive signal corresponding to the remaining PCG's of the successfully early decoded frame of the first channel.

Figure 7:
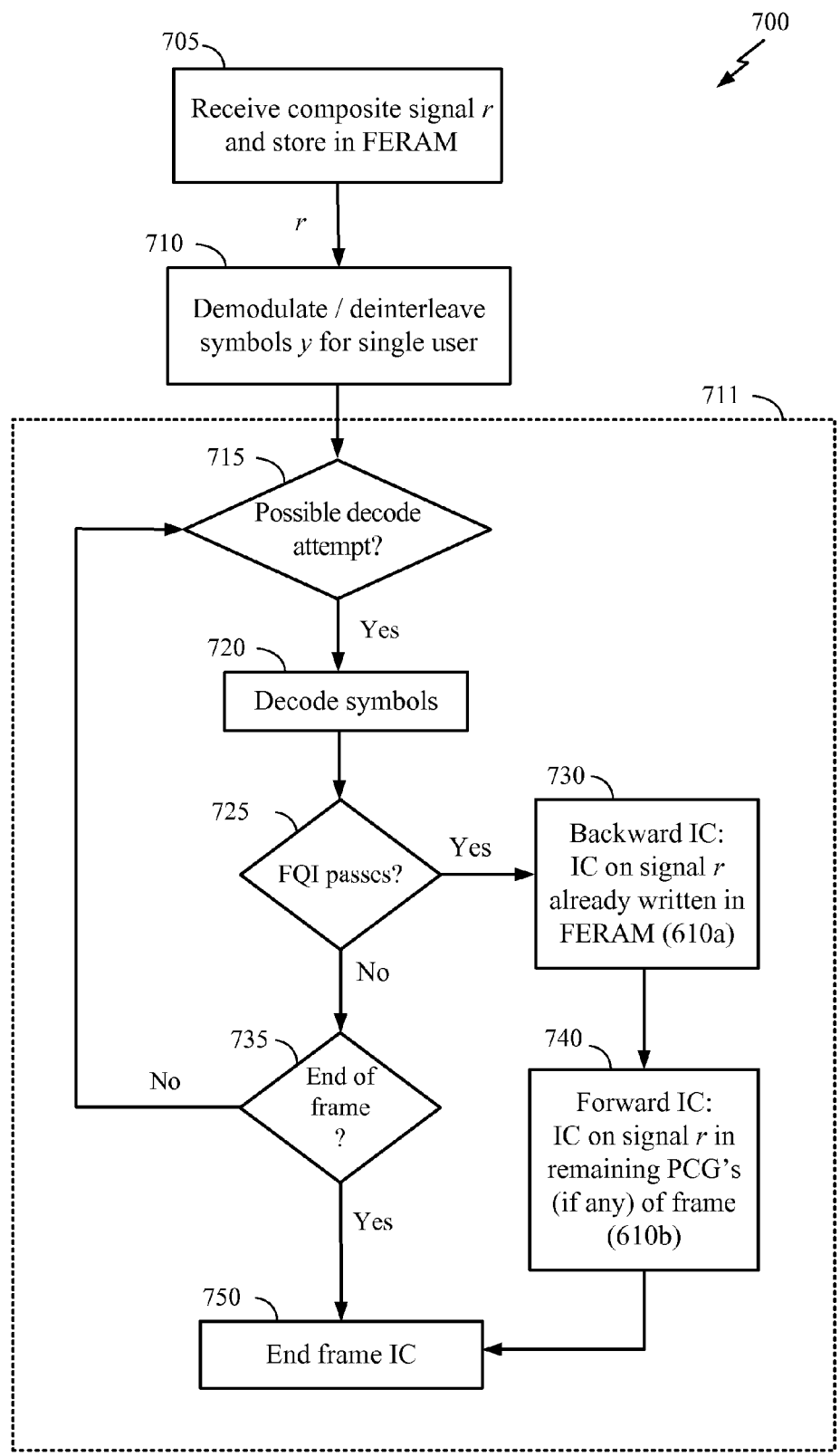
FIG. 7 illustrates an exemplary method for interference cancellation of a successfully early decoded frame from r according to the present disclosure.

FIG. 7 illustrates an exemplary method 700 for interference cancellation of a successfully early decoded frame from r according to the present disclosure.

At block 705, the composite signal r is received and stored in the FERAM.

At block 710, the signal r is demodulated for a single user and deinterleaved to produce symbols y. In an exemplary embodiment, the symbols y for a user may be stored in a corresponding BERAM.

At block 715, it is checked whether decoding may be attempted on the signal stored in the FERAM for the user. If yes, the method proceeds to block 720. It will be appreciated that the attempted decoding may be an early decode attempt as previously described herein. In an exemplary embodiment, decoding may be attempted, e.g., once every four received PCG's of the frame, as shown in FIG. 6. In alternative exemplary embodiments, decoding may be attempted at any other intervals, and such alternative exemplary embodiments are contemplated to be within the scope of the present disclosure.

At block 720, the symbols y stored in the BERAM for the user are decoded, and it is checked whether the FQI associated with the decoded bits passes at block 725. If yes, the method proceeds to block 730. If no, the method proceeds to block 735, where it is determined if the end of the frame has been reached. If the end of the frame has not been reached, the method returns to block 715; otherwise, the method proceeds to block 750.

At block 730, backward IC on the signal already stored in FERAM is performed, as previously described, e.g., with reference to 610*a* in FIG. 6. Subsequently, at block 740, forward IC of the signal in the remaining PCG's (if any) of the frame is performed, e.g., as previously described with reference to 610*b* in FIG. 6.

At block 750, IC is ended for the frame.

One of ordinary skill in the art will appreciate that while the operations collectively denoted by block 711 (i.e., blocks 720-750) are shown as being applied to a single frame for a single user in FIG. 7, multiple instances of block 711 may be readily executed to process multiple frames for multiple users to perform IC on a composite signal. Such alternative exemplary embodiments are contemplated to be within the scope of the present disclosure.

Figure 8:
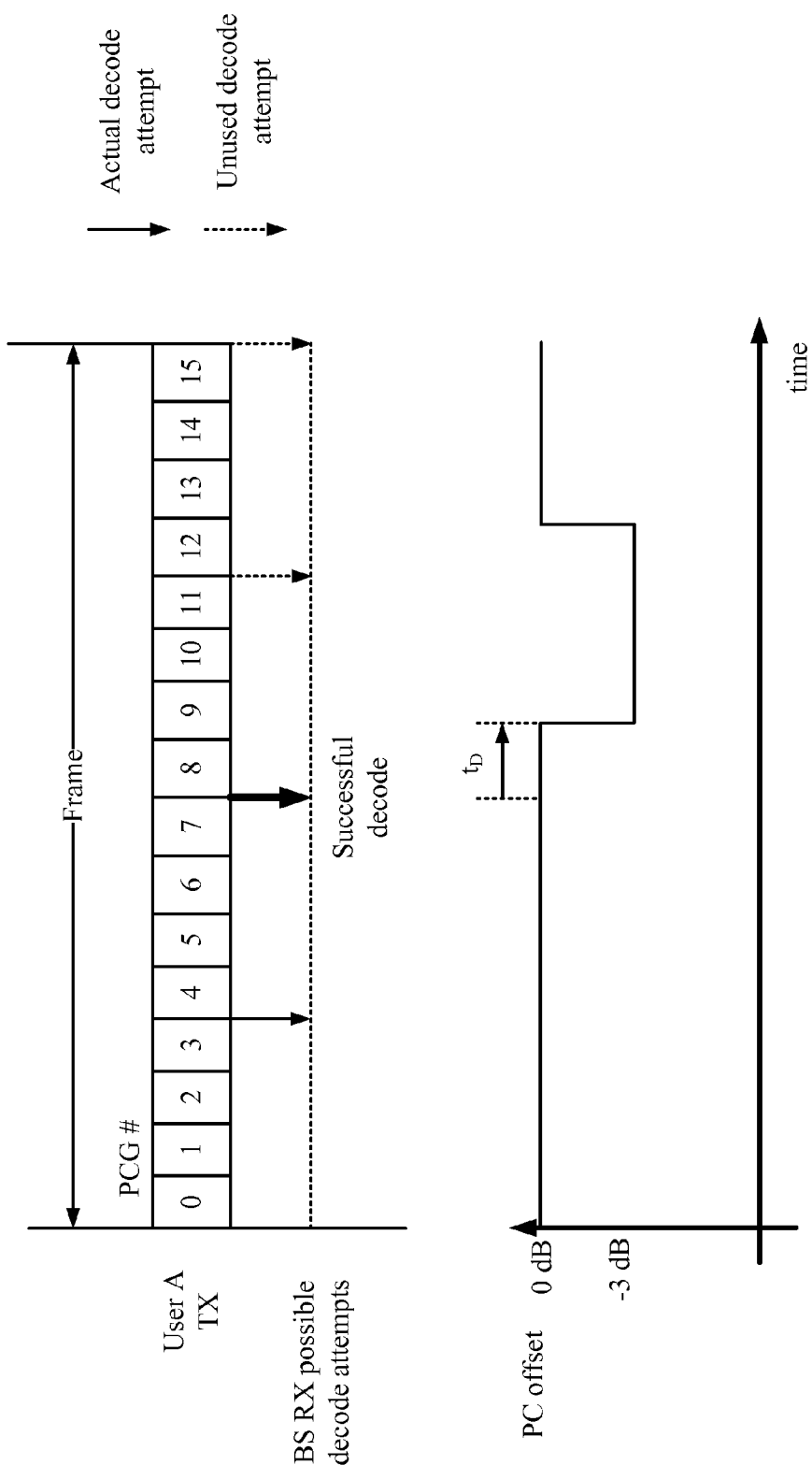
FIG. 8 illustrates an exemplary embodiment of a power control (PC) scheme according to the techniques of the present disclosure.

In an exemplary embodiment, the early decoding and IC techniques of the present disclosure may be combined with power control techniques to, e.g., decrease the transmission power of a user during the remainder of a frame following successful early decoding at a BS. FIG. 8 illustrates an exemplary embodiment of a power control (PC) scheme according to the techniques of the present disclosure.

In FIG. 8, User A transmits a plurality of PCG's making up a frame on a reverse link to a BS, as previously described herein with reference to FIG. 6. In the exemplary embodiment shown, the BS successfully early decodes the transmission after receiving PCG #7. A time $t_D$ after receiving PCG #7, the BS applies a negative power control (PC) offset to command User A to reduce its transmit power relative to the last received PCG, according to power control techniques well-known in the art. In the exemplary embodiment shown, the negative PC offset is −3 dB. It will be appreciated that the negative power control offset applied by the BS after successful early decoding advantageously reduces the interference caused to other users by the User A for the remainder of the early decoded frame.

Subsequently, prior to the start of the next frame, the BS may raise the power control offset back to 0 dB, so that User A may transmit the first PCG of the next frame at the appropriate power level. In an exemplary embodiment, the BS raises the power control offset back to 0 dB starting a predetermined number of PCG's prior to the beginning of the next frame, to account for any limits on the slew rate of the user's ability to adjust its transmit power. For example, if User A is able to adjust its transmit power at a maximum slew rate of 1 dB per PCG, and the negative PC offset is −3 dB, then the BS may raise its power control offset from −3 dB back to 0 dB starting at least 3 PCG's before the next frame. In alternative exemplary embodiments (not shown), the BS may lower or raise its power control offsets in other ways, e.g., in +/−1 dB/PCG increments over a plurality of PCG's. Such alternative exemplary embodiments are contemplated to be within the scope of the present disclosure.

In an exemplary embodiment, the PC offset shown in FIG. 8 may be directly applied to a power control target level as set, e.g., by outer loop power control (OLPC) techniques well-known in the art. Such OLPC techniques may, e.g., dynamically adjust the power control target level to maintain a target frame error rate or other target metric at the BS.

Figure 8A:
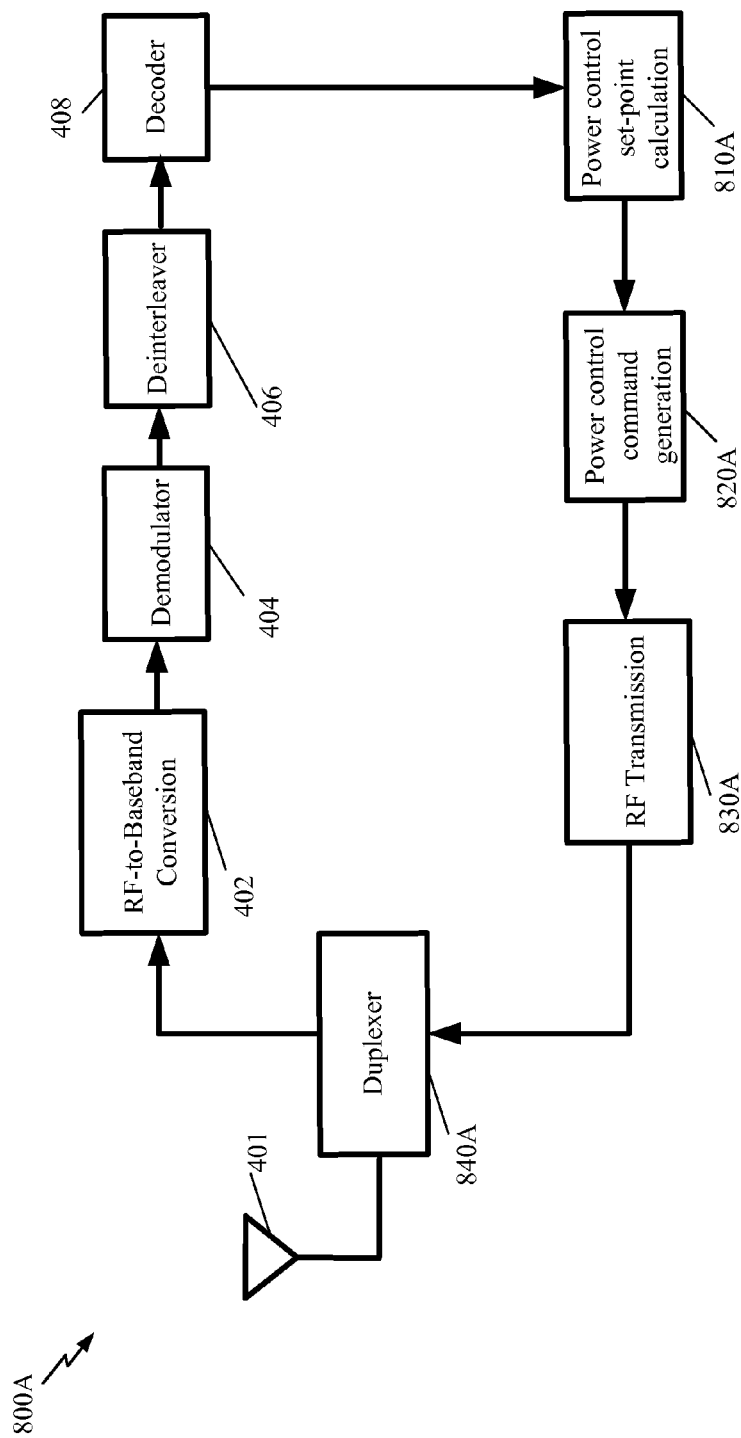
FIG. 8A illustrates an exemplary embodiment of an apparatus for implementing the power control techniques described.

FIG. 8A illustrates an exemplary embodiment 800A of an apparatus for implementing the power control techniques described. In FIG. 8A, a power control set-point calculation module 810A is coupled to the output of the decoder 408. The power control set-point calculation module 810A may be configured to reduce a power control setpoint for the first channel from an initial setpoint after successfully decoding the first channel, and for returning the power control setpoint for the first channel to the initial setpoint during or after the end of receiving the second portion of the first channel.

The power control set-point module 810A may be coupled to a power control command generator 820A for generating a power control command for the decoded user based on the power control setpoint.

The power control command generator 820A may be coupled to an RF transmission module 830A and a duplexer 840A, which allows the antenna 401 to be shared between the receive chain and the transmit chain.

In an exemplary embodiment, the power control techniques described herein with reference to FIG. 8 may be applied to situations wherein a user, or AT, is in soft handoff, as described earlier with reference to the communication system 100 of FIG. 1. In an exemplary embodiment, a central BSC may maintain a single OLPC loop assigned to the AT. The target power level of the OLPC loop is provided to each of the multiple BTS's communicating with the AT in soft handoff. Each BTS transmits a power control command (e.g., on a forward link) to the AT according to an inner loop power control (ILPC) loop to adjust the AT transmit power in accordance with the OLPC target level.

In an exemplary embodiment, when the AT is in soft handoff, each of the multiple BTS's may locally perform early decoding on a signal received from the AT, in accordance with the principles described hereinabove. One or more of the multiple BTS's may successfully early decode a frame from the AT, whereupon such one or more BTS's may apply the PC offset shown in FIG. 8 to the OLPC target level supplied by the BSC. In an exemplary embodiment, in response to receiving power control commands from multiple BTS's (some of which may not have successfully early decoded the AT's frame), the AT may be configured to reduce its transmit power level if any one of the BTS's power control commands direct the AT to do so. It will be appreciated that in such a manner, the actual transmit power of the AT is controlled as the "OR-of-the-DOWN's." Thus the AT may be successfully commanded to reduce its transmit power level upon successful early decoding by any BTS during soft handoff, while not disturbing the OLPC target level as maintained and updated by the BSC.

Figure 8B:
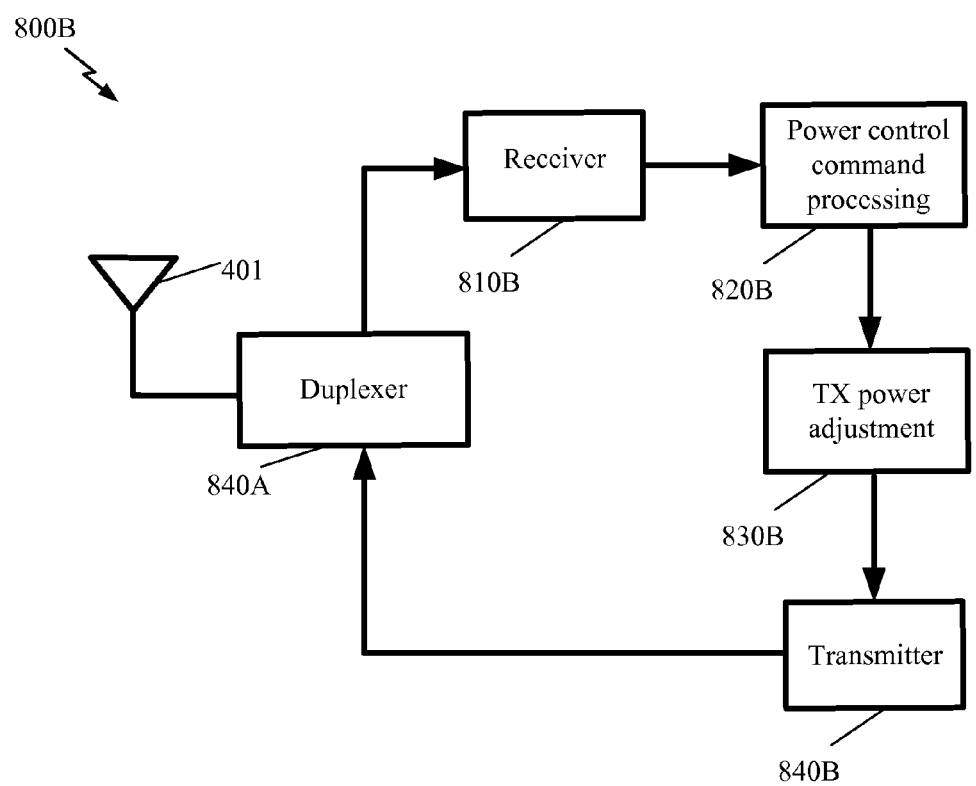
FIG. 8B illustrates an exemplary embodiment of an apparatus for implementing the power control techniques described for a user in soft handoff.

FIG. 8B illustrates an exemplary embodiment of an apparatus 800B for implementing the power control techniques described for a user in soft handoff. The apparatus 800B is for processing a power control command for a user in soft handoff. The apparatus 800B may be implemented in, e.g., an AT.

In FIG. 8B, a receiver 810B is shown for receiving power control commands from each of a plurality of base stations communicating with the user in soft handoff. Each of the power control commands may instruct the user to adjust a transmit power for a single power control group (PCG) of a frame.

A power control command processing module 820B is coupled to the receiver 810B. The power control command processing module 820B adjusts the transmit power for the PCG down if instructed to do so by any of the power control commands received. The power control command processing module 820B is coupled to a TX power adjustment block 830B, which controls the transmit power of the transmitter 840B.

Figure 9:
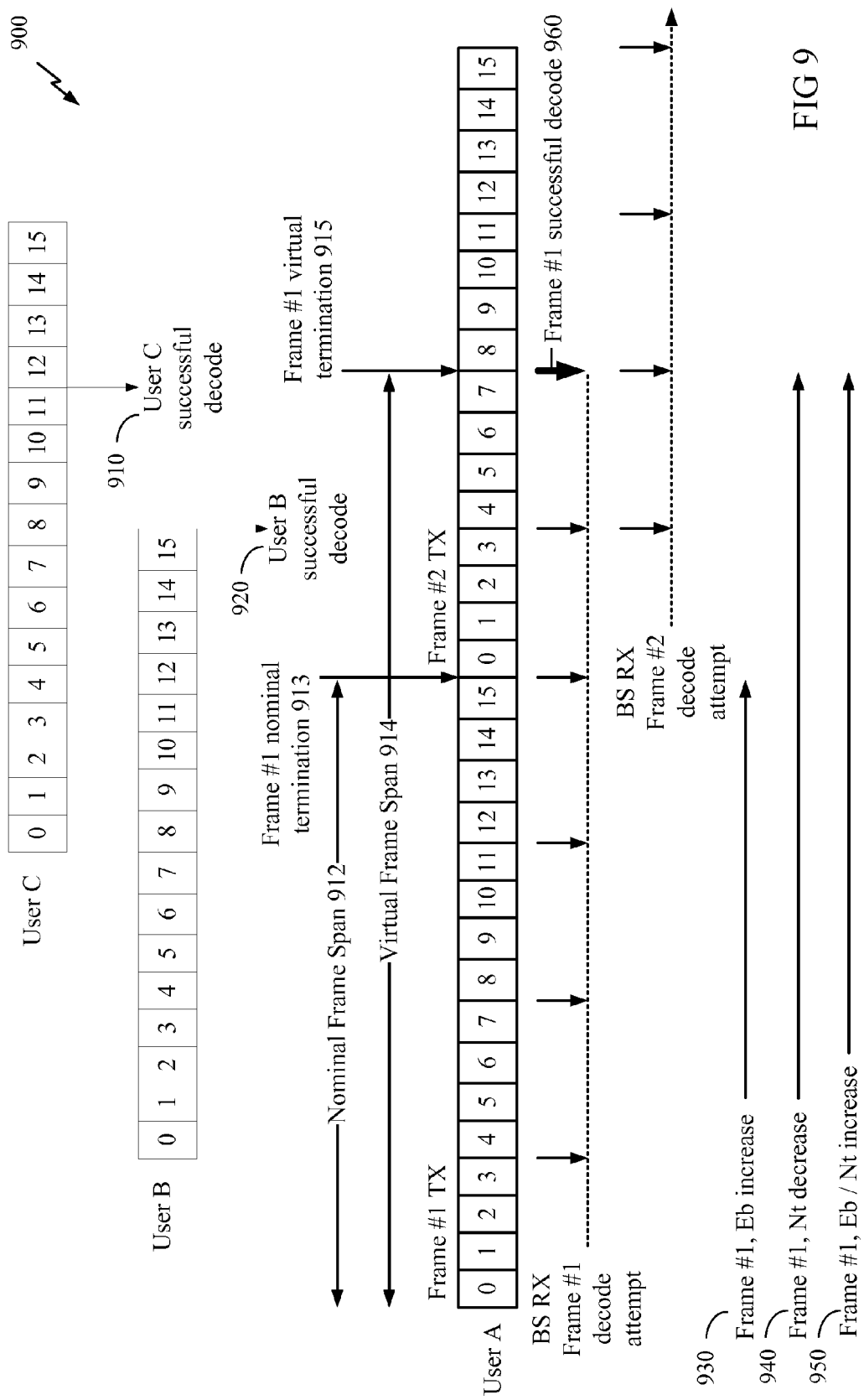
FIG. 9 illustrates an exemplary embodiment of a late decoding technique according to another aspect of the present disclosure.

FIG. 9 illustrates an exemplary embodiment of a late decoding technique according to another aspect of the present disclosure. In FIG. 9, User A, User B, and User C transmit frames to a base station (BS) receiver (not shown). The BS successfully decodes the frame of User C after receiving PCG #11 at 910, and successfully decodes the frame of User B after receiving PCG #15 at 920. However, the BS is unable to successfully decode Frame #1 of User A even after receiving PCG #15 of Frame #1, i.e., at the nominal termination 913 of the nominal frame span 912 of Frame #1. Note the nominal frame span 912 of Frame #1 denotes the time period over which User A transmits PCG's corresponding to Frame #1 to the BS.

In a technique known as late decoding, the BS continues attempting to decode Frame #1 of User A even after the end of Frame #1's nominal frame span 912. In an exemplary embodiment, the BS continues attempting to decode Frame #1 of User A up to a virtual termination 915 of a virtual frame span 914 of Frame #1, wherein the virtual frame span 914 is chosen to be longer than the nominal frame span 912. In the exemplary embodiment shown, the virtual frame span 914 of Frame #1 extends to the end of PCG #7 of Frame #2, i.e., the frame sent by User A after Frame #1. It will be appreciated that while additional PCG's are no longer received by the BS for Frame #1 after its nominal termination 913, decode attempts of Frame #1 after the nominal termination 913 may nevertheless benefit from the reduction in interference of other users, e.g., Users C and B, occurring after the nominal termination 913.

The preceding is illustrated by considering the received symbol energy (Eb) from the received PCG's of Frame #1, and the interference power over the virtual frame span of Frame #1 due to other users (Nt). As shown in FIG. 9, while Eb of Frame #1 increases at 930 only up to the nominal termination 913, Nt of Frame #1 decreases at 940 up to the virtual termination 915. This causes a net increase in Eb/Nt 950 for Frame #1 over the entire duration of its virtual frame span 914. As shown in FIG. 9, the BS eventually successfully decodes Frame #1 at 960.

In an exemplary embodiment, the virtual frame span 914 may be chosen to be sufficiently long to allow the decoding of the frame to benefit from the IC of other users, while also being not so long as to exceed an acceptable latency of reverse-link frames for each user. In the exemplary embodiment shown in FIG. 9, the virtual frame span 914 is 24 PCG's. In alternative exemplary embodiments, the virtual frame span 914 may be any other time span, e.g., 32 PCG's. In certain exemplary embodiments, a separate virtual frame span may be provided for each of a plurality of AT's transmitting to the base station on the reverse link, depending on the requirements, e.g., latency requirements, of each user.

In an exemplary embodiment, to reflect the performance gain from the late decoding techniques disclosed herein, an OLPC loop may be updated for a frame only after the virtual frame span has lapsed.

Figure 10:
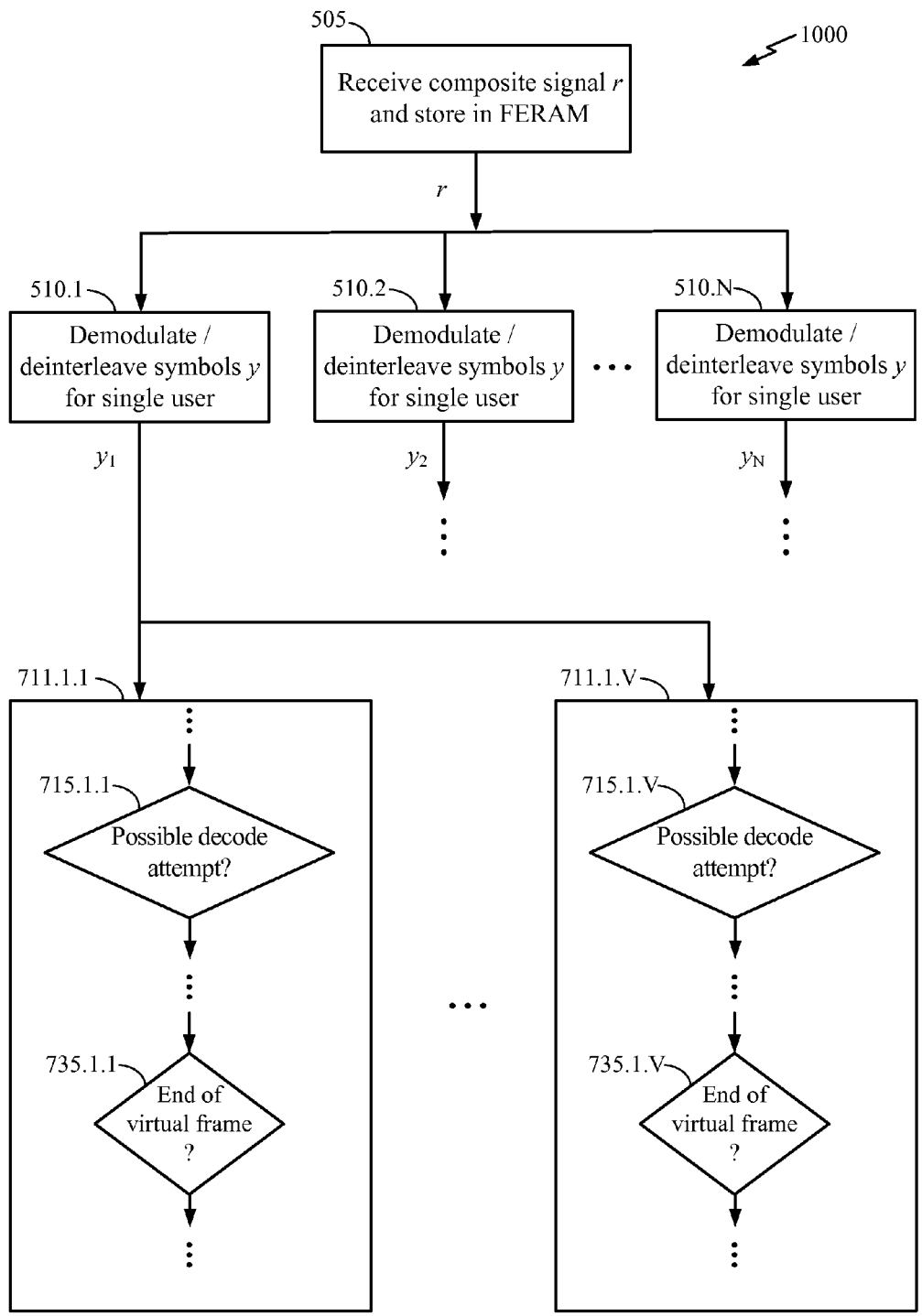
FIG. 10 illustrates an exemplary embodiment of a method for a base station to implement late decoding according to the present disclosure.

FIG. 10 illustrates an exemplary embodiment 1000 of a method for a BS to implement late decoding according to the present disclosure. Note the method 1000 is shown for illustrative purposes only, and is not meant to limit the scope of the present disclosure to any particular method shown.

In FIG. 10, at block 505, the composite signal r is received and stored in the FERAM.

Following block 505 is a plurality of blocks 510.1 through 510.N, with N corresponding to a number of users being concurrently received on the reverse link. In an exemplary embodiment, each of blocks 510.1 through 510.N may be an instance of block 510 for demodulating and deinterleaving symbols $y_n$ for a single user, as shown in FIG. 5, wherein n is an index from 1 to N. In accordance with the principles described earlier herein, demodulated and deinterleaved symbols $y_n$ for each user may be stored in a corresponding BERAM. It will be appreciated that the operations denoted in blocks 510.1 through 510.N may be performed in parallel, in succession, or a combination of both, according to, e.g., prioritizing techniques known in the art.

In FIG. 10, each of blocks 510.1 through 510.N may be followed by a plurality of blocks 711.n.1 through 711.n.V, wherein V corresponds to a late decoding buffer size to be further described hereinbelow. For ease of illustration, only blocks 711.1.1 through 711.1.V for the first demodulate/deinterleave block 510.1 is shown in FIG. 10. One of ordinary skill in the art will appreciate from FIG. 10 that blocks 510.2 through 510.N may be provided with similar blocks, and in general the late decoding buffer size V need not be uniform across all blocks 510.1 through 510.N. Such exemplary embodiments are contemplated to be within the scope of the present disclosure.

In an exemplary embodiment, each of blocks 711.1.1 through 711.1.V may be an instance of block 711 for performing IC on the composite signal r using estimated data bits $\hat{d}(t)$ for a successfully early decoded frame. For example, each of blocks 711.1.1 through 711.1.V may include blocks 715-750 for the method 711 shown in FIG. 7. Such blocks may perform operations similar to those described for the corresponding blocks in FIG. 7, unless otherwise noted. It will be understood that a number of blocks which have not been shown in each of blocks 711.1.1 for ease of illustration may nevertheless be present in an actual exemplary embodiment.

Shown particularly in block 711.1.1 of FIG. 10 is block 715.1.1, which determines whether decoding may be attempted for the user on the signal written to FERAM. It will be appreciated that in an exemplary embodiment wherein late decoding techniques according to the present disclosure are implemented, decoding may be attempted on a frame even after the nominal termination of that frame, i.e., up to a virtual termination, as described earlier herein. For example, for Frame #1 of User A illustrated in FIG. 9, block 715.1.1 may attempt decoding of Frame #1 every four PCG's up to the virtual termination 915.

Also shown particularly in block 711.1.1 is block 735.1.1, which determines whether the end of a frame has been reached. It will be appreciated that in an exemplary embodiment wherein late decoding techniques according to the present disclosure are implemented, the end of the frame to be determined at block 735.1.1 corresponds to the end of the virtual frame, rather than the end of the nominal frame.

It will be appreciated that according to the late decoding techniques described herein, a receiver may generally attempt to decode multiple frames of a user concurrently, as the virtual frame span of one frame may overlap with the nominal (and/or virtual) frame span of another frame of that same user. For example, in FIG. 9, the virtual frame span of Frame #1 overlaps with the nominal (and virtual) frame span of Frame #2 for User A, and a decode attempt on Frame #2 performed, e.g., after receiving PCG #4 of Frame #2, may occur while decode attempts are still yet to be performed on Frame #1. To accommodate such concurrent decode attempts on multiple frames, a receiver may provide a plurality V of instances of block 711 for each user, e.g., 711.n.1 through 711.n.V, wherein V corresponds to a late decoding buffer size as earlier mentioned herein.

It will be appreciated that V may be dynamically chosen based on the virtual frame span determined for a particular type of frame being received. For example, for User A of FIG. 9, setting V equal to 2 may be sufficient, as the receiver may generally not be required to decode more than 2 frames concurrently given the virtual frame span 914 shown.

Figure 11:
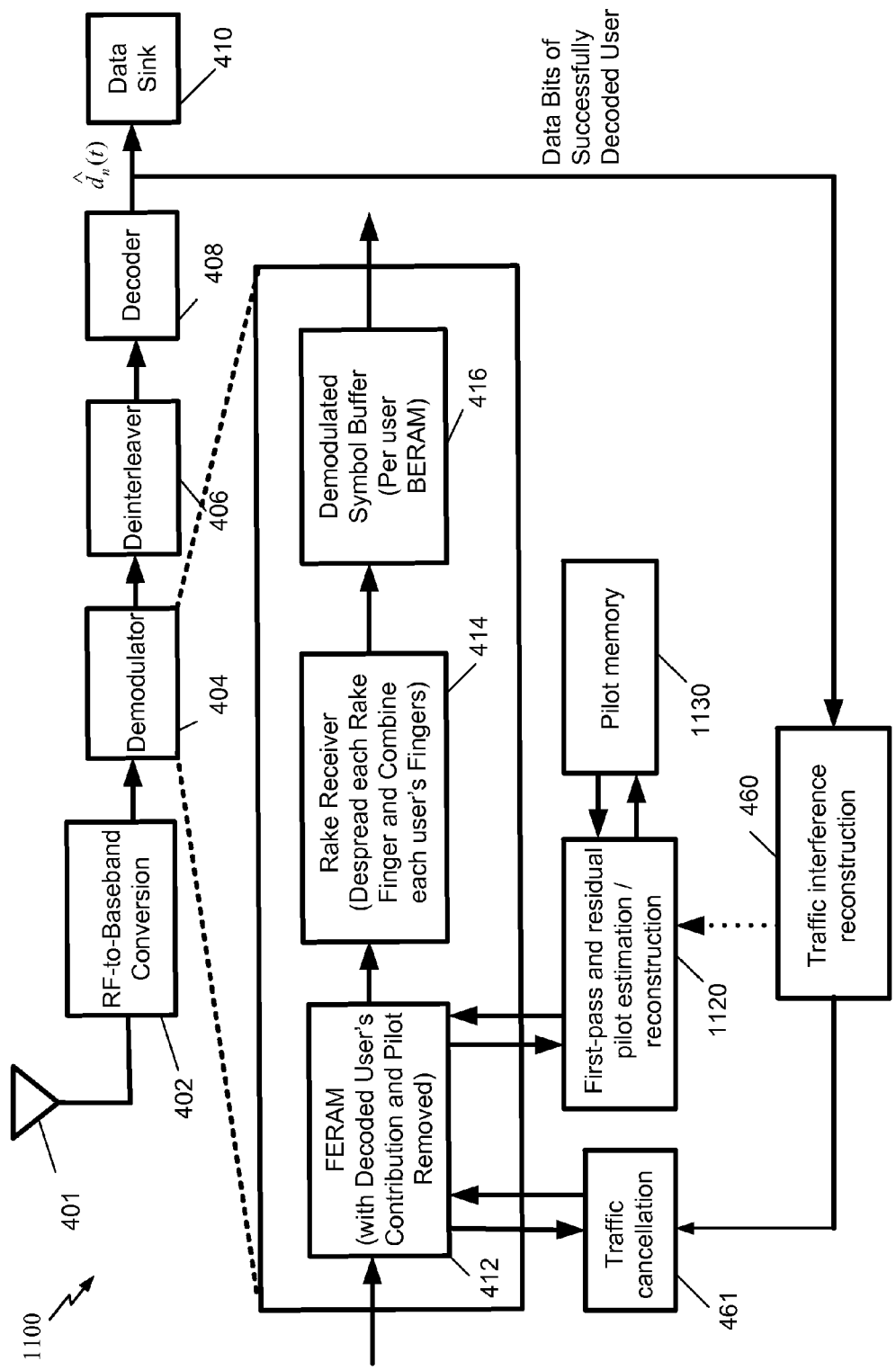
FIG. 11 illustrates an alternative exemplary embodiment of a receiver according to the present disclosure.
Figure 12:
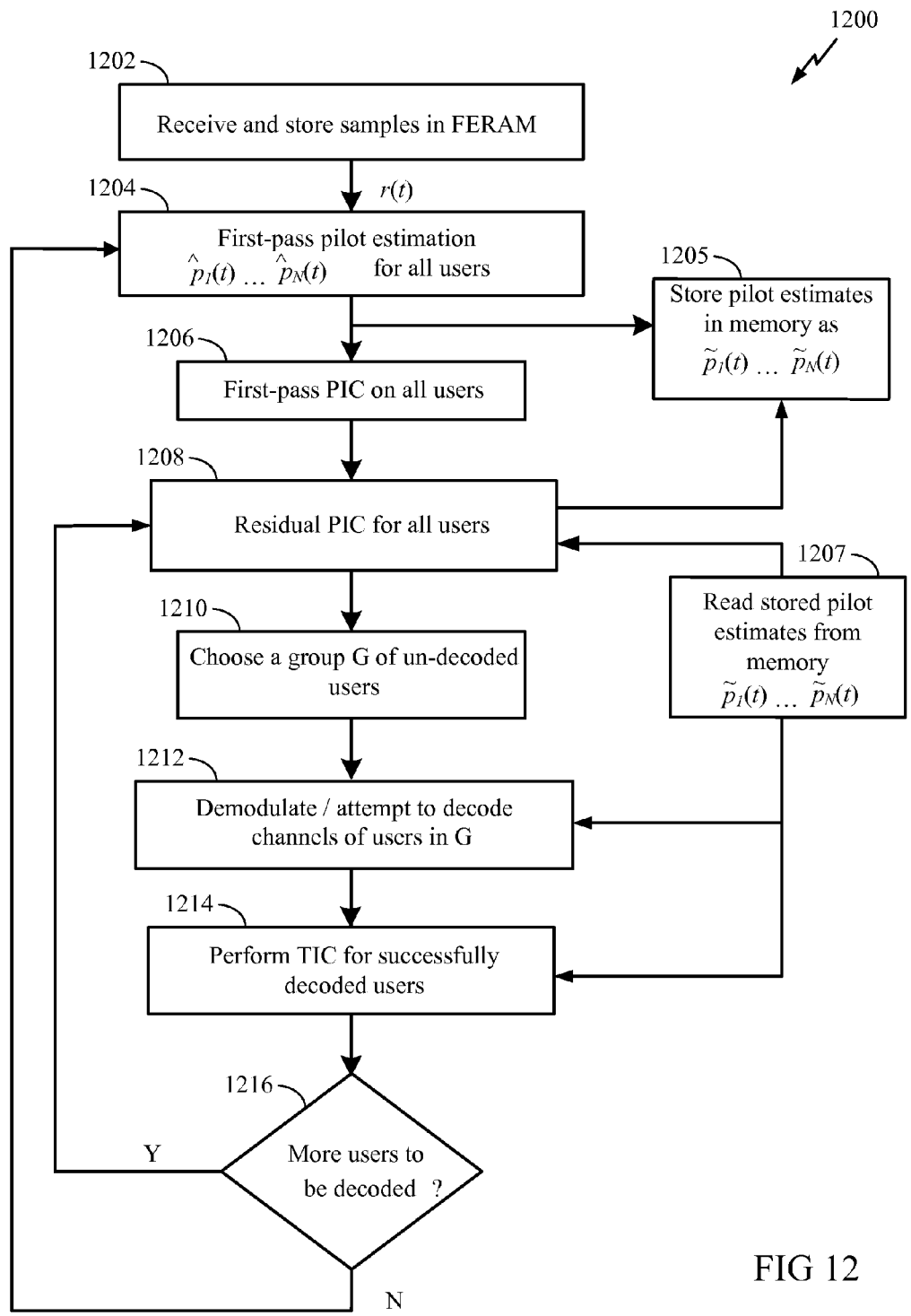
FIG. 12 illustrates a method to perform first-pass PIC, TIC, and residual PIC in the receiver of FIG. 11.
Figure 13:
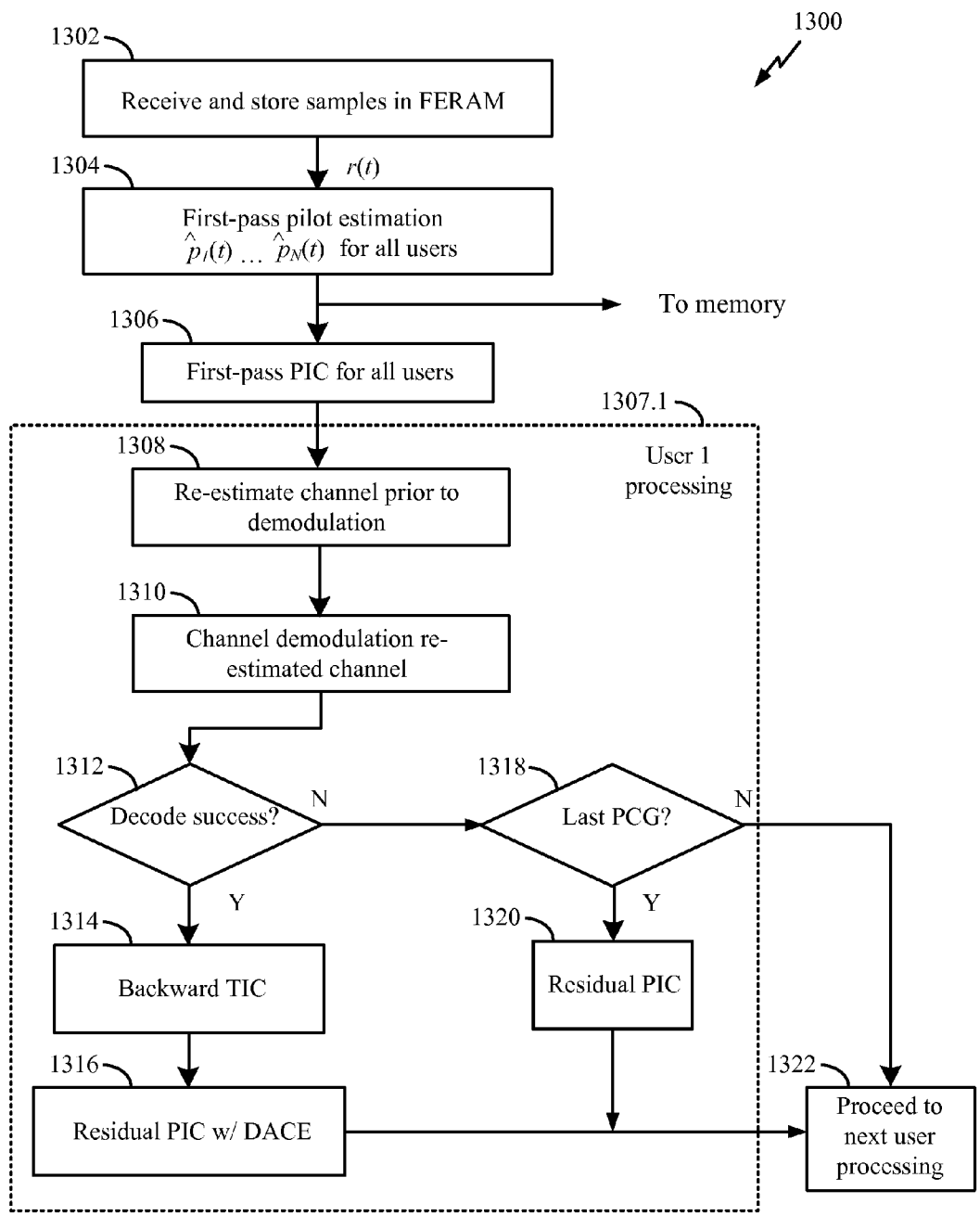
FIG. 13 illustrates an exemplary embodiment of operations performed by a residual PIC block referenced in FIG. 12.

In another aspect of the present disclosure, techniques are provided for performing residual pilot interference cancellation (PIC) to obtain a refined channel estimate, and performing subsequent traffic demodulation with such a refined channel estimate, as further described herein with reference to FIGS. 11-13.

FIG. 11 illustrates an alternative exemplary embodiment 1100 of a receiver according to the present disclosure. Note similarly labeled blocks in FIGS. 4 and 11 may perform similar functions, unless otherwise noted. The receiver 1100 includes a first-pass and residual pilot estimation/reconstruction block 1120 coupled to a pilot memory 1130, combined with a traffic reconstruction block 460 and a traffic cancellation block 461. In exemplary embodiments, the operation of the receiver 1100 may proceed as described in FIG. 12.

FIG. 12 illustrates a method 1200 to perform first-pass PIC, TIC, and residual PIC in the receiver 1100 of FIG. 11.

At block 1202, samples are continuously received and stored into an FERAM, e.g., FERAM 412 in FIG. 11.

At block 1204, first-pass pilot estimation is performed for a plurality of users 1 through N. Techniques for first-pass pilot estimation are well-known in the art, and are further described in, e.g., U.S. patent application Ser. No. 12/484,572, earlier referenced herein.

At block 1205, the estimated pilots $\hat{p}_1(t)$ through $\hat{p}_N(t)$ are stored in a pilot memory, e.g., pilot memory 1130 in FIG. 11, for later use in residual PIC. Pilot estimates stored in memory for the plurality of users 1 through N are also denoted $\tilde{p}_1(t)$ through $\tilde{p}_N(t)$.

At block 1206, first-pass pilot interference cancellation (PIC) is performed by subtracting the pilot estimates obtained at block 1204 from the samples stored in the FERAM 412.

At block 1208, residual PIC is performed for all users on the samples in the FERAM 412. It is expected that residual pilot estimation will be more accurate than first-pass pilot estimation performed at block 1204, due to, e.g., the lesser degree of interference present in the FERAM 412 samples due to the first-pass PIC already having been performed at block 1206. Residual PIC may also benefit due to TIC performed at block 1212 later described herein during previous iterations of blocks 1208-1216.

In an exemplary embodiment, the operations performed at block 1208 may be those illustrated by the residual PIC block 1208.1 shown in FIG. 13. In an exemplary embodiment, residual PIC at block 1208 may utilize the pilot estimates obtained from first-pass pilot estimation as stored in memory at block 1205, and as read from memory at block 1207.

Note the pilot estimates obtained during residual PIC at block 1208, i.e., the residual pilot estimates, may be used to further update the pilot memory at block 1205. In this manner, the pilot memory may always be provided with the latest pilot estimates.

At block 1210, a group of undecoded users G is selected.

At block 1212, traffic channel demodulation is performed. In an exemplary embodiment, traffic channel demodulation may be performed using channel estimates as obtained from residual pilot interference cancellation, e.g., as performed at block 1208. In an exemplary embodiment, such channel estimates may correspond to the latest pilot estimates as stored in a pilot memory, e.g., by reading the stored pilot estimates from memory at block 1207. In an exemplary embodiment, such channel estimates may correspond to the residual pilot estimates $\hat{p}''_n(t)$ as described further herein with reference to FIG. 13.

Further at block 1212, decoding of traffic for users in G is attempted based on the demodulated traffic channel.

At block 1214, TIC is performed for successfully decoded users by reconstructing the traffic signals based on the decoded data, and cancelling the reconstructed signals from the samples r(t) in the FERAM 412. In an exemplary embodiment, the channel estimates used for reconstructing the traffic signals may also be based on the pilot estimates as stored in the pilot memory, and read from the memory at block 1207.

At block 1216, it is checked whether there are more users to decode. If yes, the method returns to block 1208. If no, the method returns to block 1204.

Figure 12A:
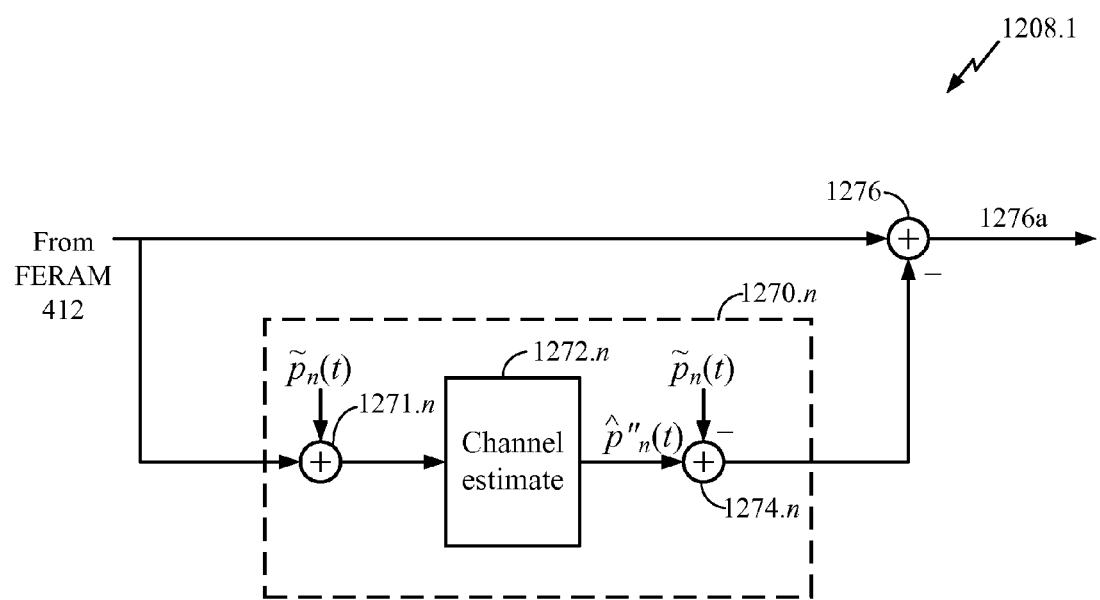

FIG. 12A illustrates an exemplary embodiment 1208.1 of operations performed by a residual PIC block 1208 referenced in FIG. 12. An instance of the blocks shown in 1260 may be provided, e.g., in each Rake finger demodulator of Rake receiver 414 in FIG. 11, wherein a separate Rake finger is assigned to a distinct multipath associated with each user n.

In FIG. 12, the signal stored in the FERAM 412 is coupled to a channel n estimation block 1270.n. In the channel n estimation block 1270.n, an adder 1271.n first adds back the pilot signal $\tilde{p}_n(t)$ previously stored for user n, e.g., at block 1205 in FIG. 12. A channel estimate block 1272.n then computes a "residual pilot estimate" $\hat{p}''_n(t)$ of the pilot signal $p_n(t)$ associated with user n based on the known pilot pattern. In an exemplary embodiment, $\hat{p}''_n(t)$ may further be based on re-encoding successfully decoded traffic bits for user n, if available. In an exemplary embodiment, the residual pilot estimate $\hat{p}''_n(t)$ may be stored in a memory, e.g., the pilot memory 1130, for use in demodulating the traffic signal.

The stored pilot signal $\tilde{p}_n(t)$ is then subtracted from the output of block 1272.n using cancellation adder 1274.n, to derive a residual difference between $\tilde{p}_n(t)$ and the residual pilot estimate $\hat{p}''_n(t)$. The output of 1274.n is subtracted from the signal $\hat{r}_1(t)$ using cancellation adder 1276 in a process known as residual PIC to generate an output signal 1276a.

FIG. 13 illustrates an alternative exemplary embodiment 1300 of a method to perform first-pass PIC, TIC, and residual PIC in the receiver 1100 of FIG. 11.

At block 1302, samples are continuously received and stored in the FERAM.

At block 1304, first-pass pilot estimation is performed for the plurality of users 1 through N. In an exemplary embodiment, the first-pass estimated pilots may be stored in memory for later use in, e.g., residual pilot interference cancellation.

At block 1306, first-pass pilot interference cancellation (PIC) is performed by subtracting the pilot estimates obtained at block 1304 from the samples stored in the FERAM 412.

After block 1306, the method proceeds to user 1 processing at block 1307.1. In the exemplary embodiment shown, block 1307.1 may further include multiple blocks as described hereinbelow. One of ordinary skill in the art will appreciate that the operations in block 1307.1 may also be repeated as necessary, e.g., using blocks 1307.2 through 1307.N (not shown) for other users 2 through N.

At block 1308, a channel for user 1 is re-estimated prior to performing channel demodulation for that user. In an exemplary embodiment, such a "re-estimated channel" may be more accurate than a channel estimate based on a first-pass pilot estimate for that user due to, e.g., the first-pass PIC performed at block 1306 for all users. Furthermore, the re-estimated channel for subsequent users, e.g., performed at a corresponding block 1308 in a block 1307.n (not shown) for a user n, may benefit from the interference cancellation already performed on previous users 1 through n−1.

At block 1310, channel demodulation for user 1 using the re-estimated channel derived at block 1308 is performed.

One of ordinary skill in the art will appreciate that in certain exemplary embodiments, channel re-estimation and channel demodulation at blocks 1308-1310 may be performed across a plurality of RAKE fingers, and the results combined in, e.g., a BERAM.

At block 1312, decoding is attempted on the demodulated symbols, and it is determined whether the decoding is a success. If yes, the method proceeds to block 1314. If no, the method proceeds to block 1318.

At block 1314, backward TIC is performed for the successfully decoded frame of the user, according to principles earlier described herein.

At block 1316, residual PIC may also be performed on the samples in the FERAM to remove possible interference from the successfully decoded user's pilot to other users yet to be decoded. In an exemplary embodiment, residual PIC may proceed based on a data-augmented channel estimate (DACE), as further described in co-pending application, U.S. patent application Ser. No. 12/484,572, earlier referenced herein. In an exemplary embodiment, residual PIC may utilize the first-pass pilot estimates stored in memory after block 1304, as earlier described herein with reference to FIG. 12A.

After block 1316, the method proceeds to block 1322, where processing for the next user is performed, e.g., according to a block 1307.2 (not shown) for a user 2.

At block 1318, it is checked whether the current PCG received is the last PCG for the user. In an exemplary embodiment, the "last" PCG may be defined as the last PCG of a virtual frame, as earlier described herein with reference to FIG. 9. Alternatively, the "last" PCG may be defined as the last PCG of a nominal frame, or any other type of frame. If yes, the method proceeds to block 1320. If no, the method proceeds to block 1322, where processing for the next user is performed.

At block 1320, residual PIC may be performed on the samples in the FERAM. Residual PIC may be performed, e.g., as earlier described herein with reference to FIG. 12A.

Figure 14:
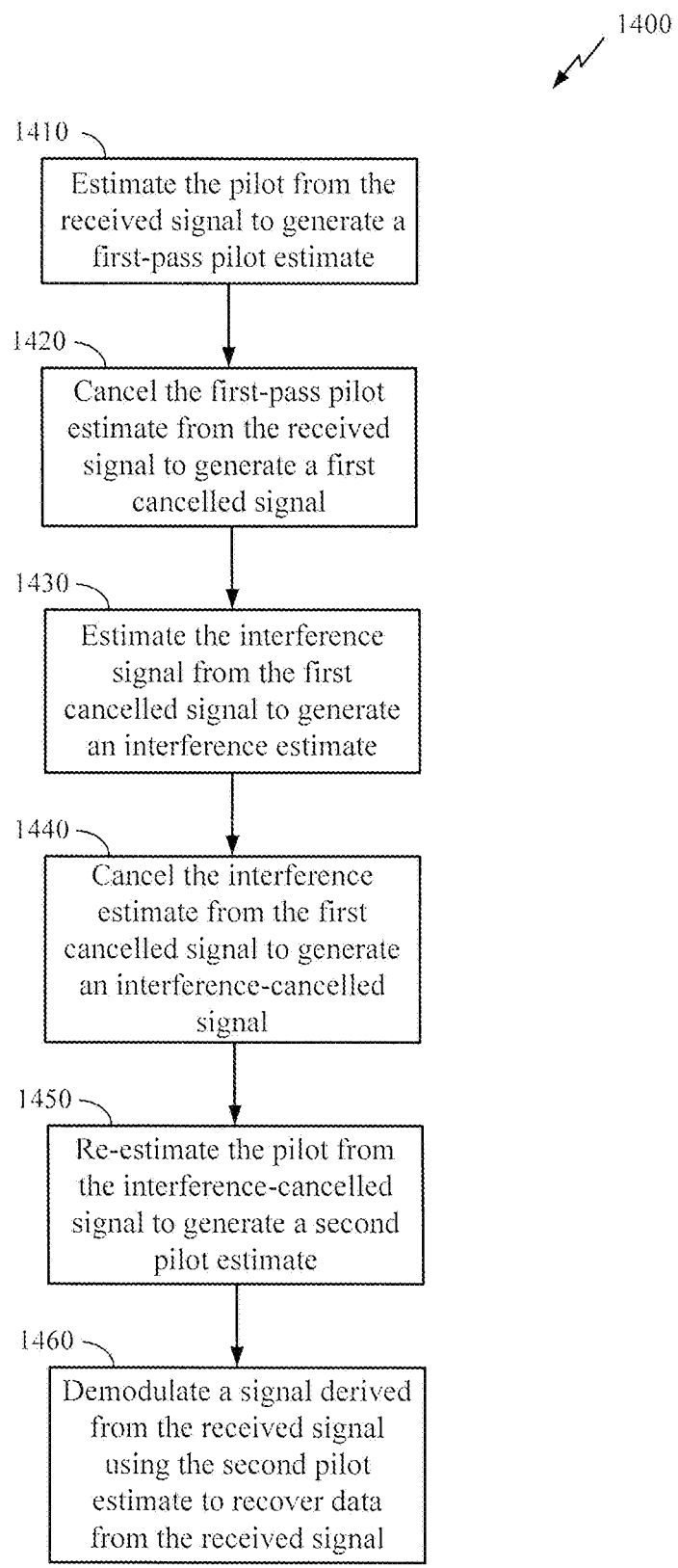
FIG. 14 illustrates an exemplary embodiment of a method according to the present disclosure.

FIG. 14 illustrates an exemplary embodiment 1400 of a method according to the present disclosure. Note the method 1400 is shown for illustrative purposes only, and is not meant to limit the scope of the present disclosure to any particular method shown. The method shown is for recovering data from a received signal comprising a pilot and an interference signal.

At block 1410, the method estimates the pilot from the received signal to generate a first-pass pilot estimate. In an exemplary embodiment, the first-pass pilot estimate may be generated according to first-pass pilot estimation techniques known in the art, e.g., as described with reference to block 1304 of FIG. 13.

At block 1420, the method cancels the first-pass pilot estimate from the received signal to generate a first cancelled signal. In an exemplary embodiment, this corresponds to the first-pass PIC for the user to be demodulated as described with reference to block 1306 of FIG. 13.

At block 1430, the method estimates the interference signal from the first cancelled signal to generate an interference estimate. In an exemplary embodiment, the interference signal may be one or more pilots for other users present in the received signal. In an exemplary embodiment, the interference signal may also be a traffic signal associated with the user to be demodulated as known from, e.g., early decoding techniques according to the present disclosure, or traffic signals associated with other users.

At block 1440, the method cancels the interference estimate from the first cancelled signal to generate an interference-cancelled signal. In an exemplary embodiment, this corresponds to first-pass PIC for other users as described with reference to block 1306 of FIG. 13. In an exemplary embodiment, the cancelled interference estimate may also be a cancelled traffic signal for the user to be demodulated.

At block 1450, the method re-estimates the pilot from the interference-cancelled signal to generate a second pilot estimate. In an exemplary embodiment, this corresponds to operations performed for residual PIC as described with reference to block 1308 of FIG. 13. For example, the second pilot estimate may correspond to the residual pilot estimate $\hat{p}''_n(t)$.

At block 1460, the method demodulates a signal derived from the received signal using the second pilot estimate to recover data from the received signal. This may correspond, e.g., to the operations performed at block 1312 of FIG. 13.

While certain exemplary embodiments of the present disclosure have been described with reference to a cdma2000 system, it will be appreciated that the disclosed techniques may readily be applied to alternative systems. Further described herein with reference to FIGS. 15A-15D is an example prior art radio network operating according to UMTS in which the principles of the present disclosure may be applied. Note FIGS. 15A-15D are shown for illustrative background purposes only, and are not meant to limit the scope of the present disclosure to radio networks operating according to UMTS.

Figure 15A:
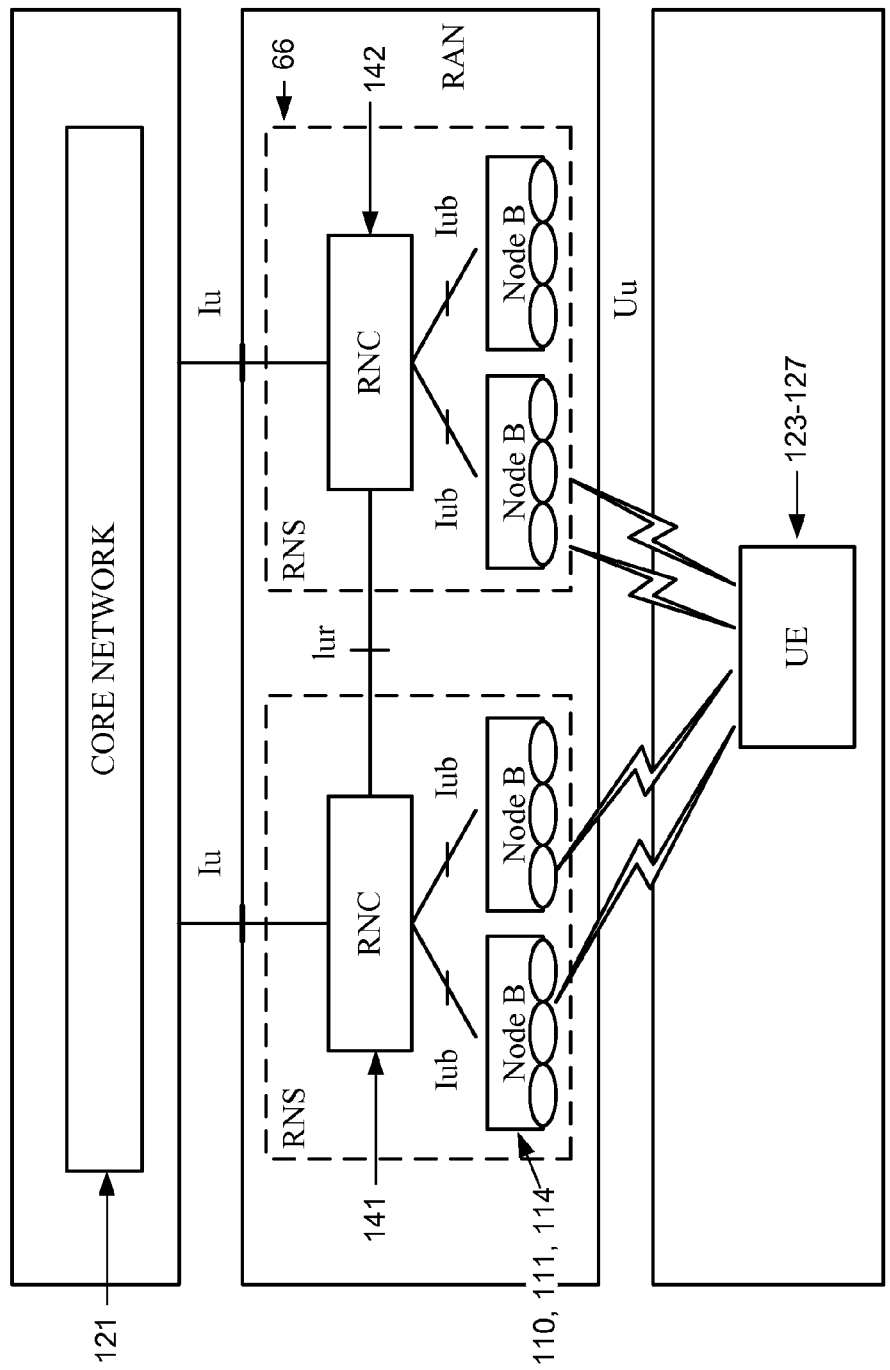
FIGS. 15A-15D illustrate an example prior art radio network operating according to UMTS in which the principles of the present disclosure may be applied.

FIG. 15A illustrates an example of a prior art radio network. In FIG. 15A, Node Bs 110, 111, 114 and radio network controllers 141-144 are parts of a network called "radio network," "RN," "access network," or "AN." The radio network may be a UMTS Terrestrial Radio Access Network (UTRAN). A UMTS Terrestrial Radio Access Network (UTRAN) is a collective term for the Node Bs (or base stations) and the control equipment for the Node Bs (or radio network controllers (RNC)) it contains which make up the UMTS radio access network. This is a 3G communications network which can carry both real-time circuit-switched and IP-based packet-switched traffic types. The UTRAN provides an air interface access method for the user equipment (UE) 123-127. Connectivity is provided between the UE and the core network by the UTRAN. The radio network may transport data packets between multiple user equipment devices 123-127.

The UTRAN is connected internally or externally to other functional entities by four interfaces: Iu, Uu, Iub and Iur. The UTRAN is attached to a GSM core network 121 via an external interface called Iu. Radio network controllers (RNC's) 141-144 (shown in FIG. 15B), of which 141, 142 are shown in FIG. 15A, support this interface. In addition, the RNC manages a set of base stations called Node Bs through interfaces labeled Iub. The Iur interface connects two RNCs 141, 142 with each other. The UTRAN is largely autonomous from the core network 121 since the RNCs 141-144 are interconnected by the Iur interface. FIG. 15A discloses a communication system which uses the RNC, the Node Bs and the Iu and Uu interfaces. The Uu is also external and connects the Node B with the UE, while the Iub is an internal interface connecting the RNC with the Node B.

The radio network may be further connected to additional networks outside the radio network, such as a corporate intranet, the Internet, or a conventional public switched telephone network as stated above, and may transport data packets between each user equipment device 123-127 and such outside networks.

Figure 15B:
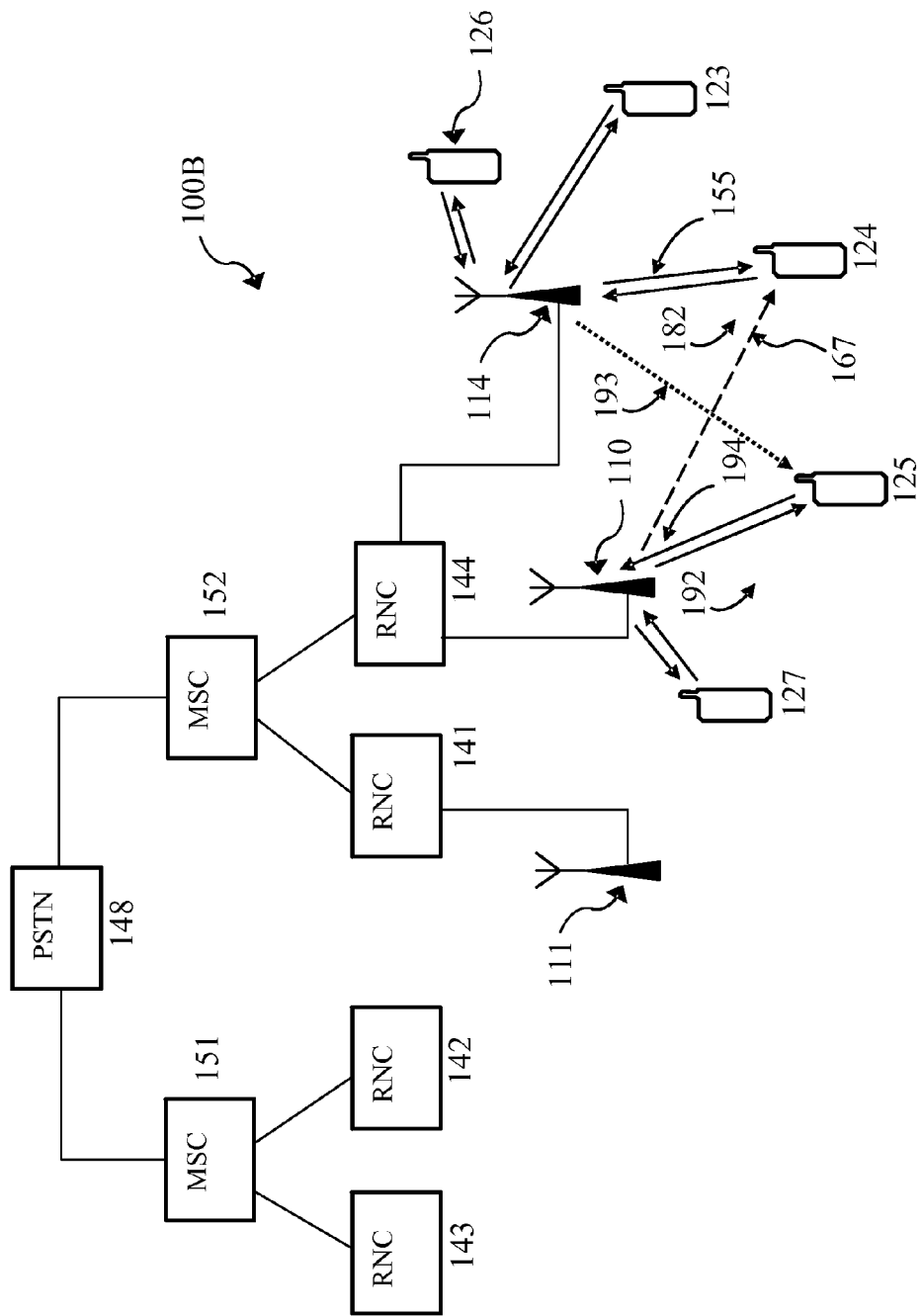

FIG. 15B illustrates selected components of a communication network 100B, which includes a radio network controller (RNC) (or base station controller (BSC)) 141-144 coupled to Node Bs (or base stations or wireless base transceiver stations) 110, 111, and 114. The Node Bs 110, 111, 114 communicate with user equipment (or remote stations) 123-127 through corresponding wireless connections 155, 167, 182, 192, 193, 194. The RNC 141-144 provides control functionalities for one or more Node Bs. The radio network controller 141-144 is coupled to a public switched telephone network (PSTN) 148 through a mobile switching center (MSC) 151, 152. In another example, the radio network controller 141-144 is coupled to a packet switched network (PSN) (not shown) through a packet data server node ("PDSN") (not shown). Data interchange between various network elements, such as the radio network controller 141-144 and a packet data server node, can be implemented using any number of protocols, for example, the Internet Protocol ("IP"), an asynchronous transfer mode ("ATM") protocol, T1, E1, frame relay, and other protocols.

The RNC fills multiple roles. First, it may control the admission of new mobiles or services attempting to use the Node B. Second, from the Node B, or base station, point of view, the RNC is a controlling RNC. Controlling admission ensures that mobiles are allocated radio resources (bandwidth and signal/noise ratio) up to what the network has available. It is where the Node B's Iub interface terminates. From the UE, or mobile, point of view, the RNC acts as a serving RNC in which it terminates the mobile's link layer communications. From a core network point of view, the serving RNC terminates the Iu for the UE. The serving RNC also controls the admission of new mobiles or services attempting to use the core network over its Iu interface.

For an air interface, UMTS most commonly uses a wideband spread-spectrum mobile air interface known as wideband code division multiple access (or W-CDMA). W-CDMA uses a direct sequence code division multiple access signaling method (or CDMA) to separate users. W-CDMA (Wideband Code Division Multiple Access) is a third generation standard for mobile communications. W-CDMA evolved from GSM (Global System for Mobile Communications)/GPRS a second generation standard, which is oriented to voice communications with limited data capability. The first commercial deployments of W-CDMA are based on a version of the standards called W-CDMA Release 99.

The Release 99 specification defines two techniques to enable Uplink packet data. Most commonly, data transmission is supported using either the Dedicated Channel (DCH) or the Random Access Channel (RACH). However, the DCH is the primary channel for support of packet data services. Each remote station 123-127 uses an orthogonal variable spreading factor (OVSF) code. An OVSF code is an orthogonal code that facilitates uniquely identifying individual communication channels, as will be appreciated by one skilled in the art. In addition, micro diversity is supported using soft handover and closed loop power control is employed with the DCH.

Pseudorandom noise (PN) sequences are commonly used in CDMA systems for spreading transmitted data, including transmitted pilot signals. The time used to transmit a single value of the PN sequence is known as a chip, and the rate at which the chips vary is known as the chip rate. Inherent in the design of direct sequence CDMA systems is that a receiver aligns its PN sequences to those of the Node B 110, 111, 114. Some systems, such as those defined by the W-CDMA standard, differentiate base stations 110, 111, 114 using a unique PN code for each, known as a primary scrambling code. The W-CDMA standard defines two Gold code sequences for scrambling the downlink, one for the in-phase component (I) and another for the quadrature (Q). The I and Q PN sequences together are broadcast throughout the cell without data modulation. This broadcast is referred to as the common pilot channel (CPICH). The PN sequences generated are truncated to a length of 38,400 chips. A period of 38,400 chips is referred to as a radio frame. Each radio frame is divided into 15 equal sections referred to as slots. W-CDMA Node Bs 110, 111, 114 operate asynchronously in relation to each other, so knowledge of the frame timing of one base station 110, 111, 114 does not translate into knowledge of the frame timing of any other Node B 110, 111, 114. In order to acquire this knowledge, W-CDMA systems use synchronization channels and a cell searching technique.

3GPP Release 5 and later supports High-Speed Downlink Packet Access (HSDPA). 3GPP Release 6 and later supports High-Speed Uplink Packet Access (HSUPA). HSDPA and HSUPA are sets of channels and procedures that enable high-speed packet data transmission on the downlink and uplink, respectively. Release 7 HSPA+ uses 3 enhancements to improve data rate. First, it introduced support for 2×2 MIMO on the downlink. With MIMO, the peak data rate supported on the downlink is 28 Mbps. Second, higher order modulation is introduced on the downlink. The use of 64 QAM on the downlink allows peak data rates of 21 Mbps. Third, higher order modulation is introduced on the uplink. The use of 16 QAM on the uplink allows peak data rates of 11 Mbps.

In HSUPA, the Node B 110, 111, 114 allows several user equipment devices 123-127 to transmit at a certain power level at the same time. These grants are assigned to users by using a fast scheduling algorithm that allocates the resources on a short-term basis (every tens of ms). The rapid scheduling of HSUPA is well suited to the bursty nature of packet data. During periods of high activity, a user may get a larger percentage of the available resources, while getting little or no bandwidth during periods of low activity.

In 3GPP Release 5 HSDPA, a base transceiver station 110, 111, 114 of an access network sends downlink payload data to user equipment devices 123-127 on High Speed Downlink Shared Channel (HS-DSCH), and the control information associated with the downlink data on High Speed Shared Control Channel (HS-SCCH). There are 256 Orthogonal Variable Spreading Factor (OVSF or Walsh) codes used for data transmission. In HSDPA systems, these codes are partitioned into release 1999 (legacy system) codes that are typically used for cellular telephony (voice), and HSDPA codes that are used for data services. For each transmission time interval (TTI), the dedicated control information sent to an HSDPA-enabled user equipment device 123-127 indicates to the device which codes within the code space will be used to send downlink payload data to the device, and the modulation that will be used for transmission of the downlink payload data.

With HSDPA operation, downlink transmissions to the user equipment devices 123-127 may be scheduled for different transmission time intervals using the 15 available HSDPA OVSF codes. For a given TTI, each user equipment device 123-127 may be using one or more of the 15 HSDPA codes, depending on the downlink bandwidth allocated to the device during the TTI. As has already been mentioned, for each TTI the control information indicates to the user equipment device 123-127 which codes within the code space will be used to send downlink payload data (data other than control data of the radio network) to the device, and the modulation that will be used for transmission of the downlink payload data.

In a MIMO system, there are N (# of transmitter antennas) by M (# of receiver antennas) signal paths from the transmit and the receive antennas, and the signals on these paths are not identical. MIMO creates multiple data transmission pipes. The pipes are orthogonal in the space-time domain. The number of pipes equals the rank of the system. Since these pipes are orthogonal in the space-time domain, they create little interference with each other. The data pipes are realized with proper digital signal processing by properly combining signals on the N×M paths. It is noted that a transmission pipe does not correspond to an antenna transmission chain or any one particular transmission path.

Communication systems may use a single carrier frequency or multiple carrier frequencies. Each link may incorporate a different number of carrier frequencies. Furthermore, an access terminal 123-127 may be any data device that communicates through a wireless channel or through a wired channel, for example using fiber optic or coaxial cables. An access terminal 123-127 may be any of a number of types of devices including but not limited to PC card, compact flash, external or internal modem, or wireless or wireline phone. The access terminal 123-127 is also known as user equipment (UE), a remote station, a mobile station or a subscriber station. Also, the UE 123-127 may be mobile or stationary.

User equipment 123-127 that has established an active traffic channel connection with one or more Node Bs 110, 111, 114 is called active user equipment 123-127, and is said to be in a traffic state. User equipment 123-127 that is in the process of establishing an active traffic channel connection with one or more Node Bs 110, 111, 114 is said to be in a connection setup state. User equipment 123-127 may be any data device that communicates through a wireless channel or through a wired channel, for example using fiber optic or coaxial cables. The communication link through which the user equipment 123-127 sends signals to the Node B 110, 111, 114 is called an uplink. The communication link through which a Node B 110, 111, 114 sends signals to a user equipment 123-127 is called a downlink.

Figure 15C:
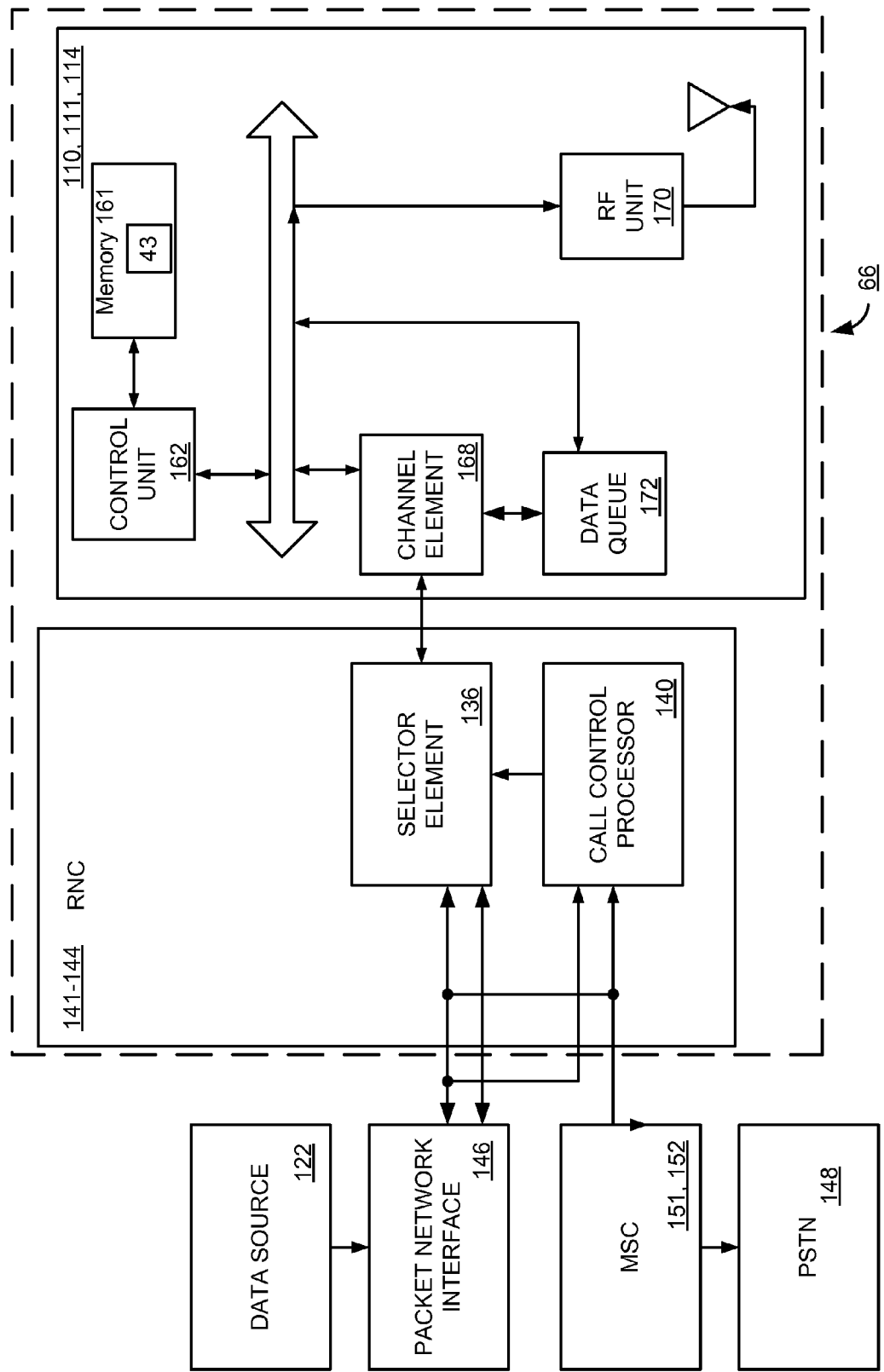

FIG. 15C is detailed herein below, wherein specifically, a Node B 110, 111, 114 and radio network controller 141-144 interface with a packet network interface 146. (Note in FIG. 15C, only one Node B 110, 111, 114 is shown for simplicity.) The Node B 110, 111, 114 and radio network controller 141-144 may be part of a radio network server (RNS) 66, shown in FIG. 15A and in FIG. 15C as a dotted line surrounding one or more Node Bs 110, 111, 114 and the radio network controller 141-144. The associated quantity of data to be transmitted is retrieved from a data queue 172 in the Node B 110, 111, 114 and provided to the channel element 168 for transmission to the user equipment 123-127 (not shown in FIG. 15C) associated with the data queue 172.

Radio network controller 141-144 interfaces with a Public Switched Telephone Network (PSTN) 148 through a mobile switching center 151, 152. Also, radio network controller 141-144 interfaces with Node Bs 110, 111, 114 in the communication system 100B. In addition, radio network controller 141-144 interfaces with a Packet Network Interface 146. Radio network controller 141-144 coordinates the communication between user equipment 123-127 in the communication system and other users connected to a packet network interface 146 and PSTN 148. PSTN 148 interfaces with users through a standard telephone network (not shown in FIG. 15C).

Radio network controller 141-144 contains many selector elements 136, although only one is shown in FIG. 15C for simplicity. Each selector element 136 is assigned to control communication between one or more Node B's 110, 111, 114 and one remote station 123-127 (not shown). If selector element 136 has not been assigned to a given user equipment 123-127, call control processor 140 is informed of the need to page the user equipment 123-127. Call control processor 140 then directs Node B 110, 111, 114 to page the user equipment 123-127.

Data source 122 contains a quantity of data, which is to be transmitted to a given user equipment 123-127. Data source 122 provides the data to packet network interface 146. Packet network interface 146 receives the data and routes the data to the selector element 136. Selector element 136 then transmits the data to Node B 110, 111, 114 in communication with the target user equipment 123-127. In the exemplary embodiment, each Node B 110, 111, 114 maintains a data queue 172, which stores the data to be transmitted to the user equipment 123-127.

For each data packet, channel element 168 inserts the necessary control fields. In the exemplary embodiment, channel element 168 performs a cyclic redundancy check, CRC, encoding of the data packet and control fields and inserts a set of code tail bits. The data packet, control fields, CRC parity bits, and code tail bits comprise a formatted packet. In the exemplary embodiment, channel element 168 then encodes the formatted packet and interleaves (or reorders) the symbols within the encoded packet. In the exemplary embodiment, the interleaved packet is covered with a Walsh code, and spread with the short PNI and PNQ codes. The spread data is provided to RF unit 170 which quadrature modulates, filters, and amplifies the signal. The downlink signal is transmitted over the air through an antenna to the downlink.

At the user equipment 123-127, the downlink signal is received by an antenna and routed to a receiver. The receiver filters, amplifies, quadrature demodulates, and quantizes the signal. The digitized signal is provided to a demodulator where it is despread with the short PNI and PNQ codes and decovered with the Walsh cover. The demodulated data is provided to a decoder which performs the inverse of the signal processing functions done at Node B 110, 111, 114, specifically the de-interleaving, decoding, and CRC check functions. The decoded data is provided to a data sink.

Figure 15D:
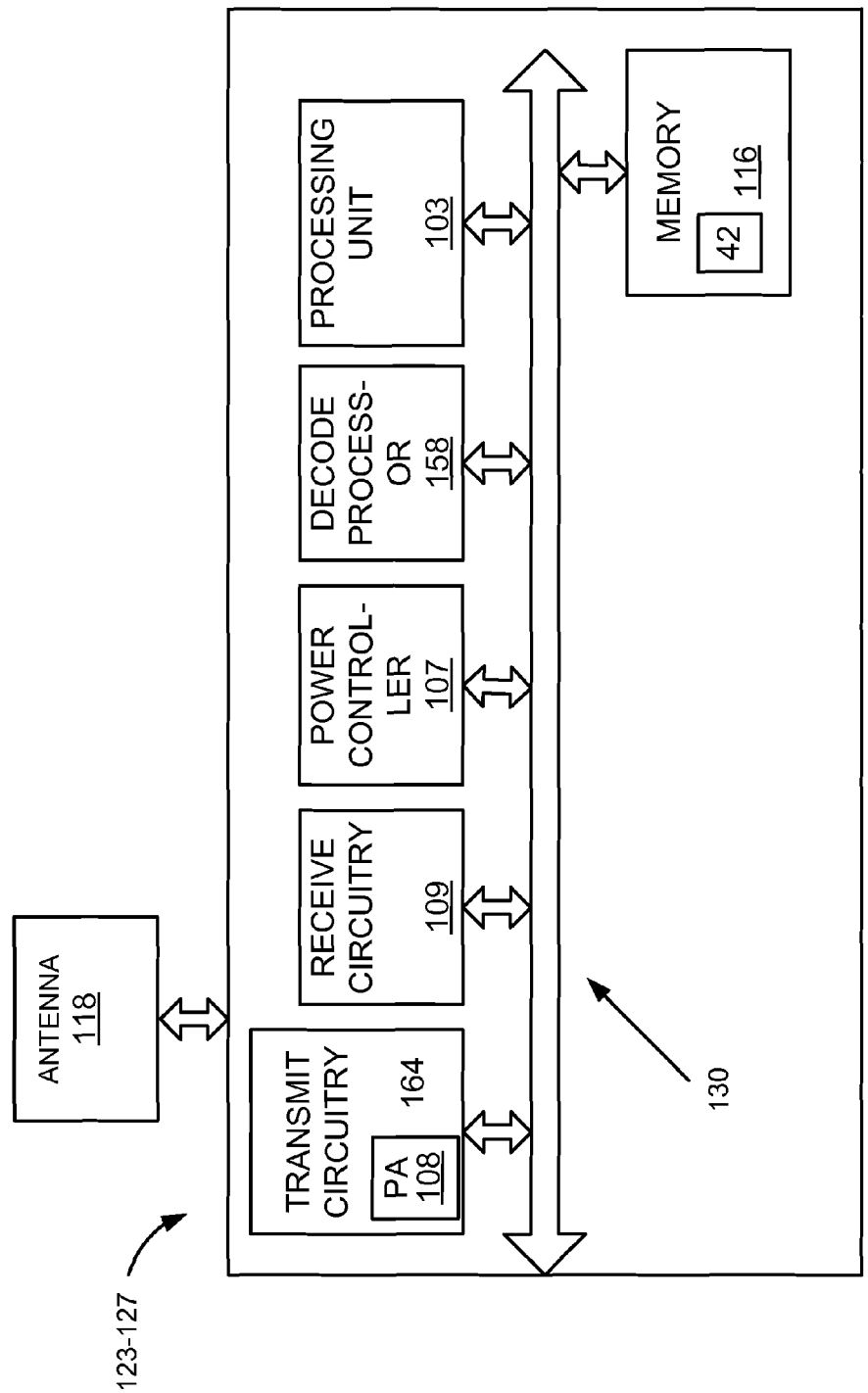

FIG. 15D illustrates an embodiment of a user equipment (UE) 123-127 in which the UE 123-127 includes transmit circuitry 164 (including PA 108), receive circuitry 109, power controller 107, decode processor 158, processing unit 103, and memory 116.

The processing unit 103 controls operation of the UE 123-127. The processing unit 103 may also be referred to as a CPU. Memory 116, which may include both read-only memory (ROM) and random access memory (RAM), provides instructions and data to the processing unit 103. A portion of the memory 116 may also include non-volatile random access memory (NVRAM).

The UE 123-127, which may be embodied in a wireless communication device such as a cellular telephone, may also include a housing that contains a transmit circuitry 164 and a receive circuitry 109 to allow transmission and reception of data, such as audio communications, between the UE 123-127 and a remote location. The transmit circuitry 164 and receive circuitry 109 may be coupled to an antenna 118.

The various components of the UE 123-127 are coupled together by a bus system 130 which may include a power bus, a control signal bus, and a status signal bus in addition to a data bus. However, for the sake of clarity, the various busses are illustrated in FIG. 15D as the bus system 130. The UE 123-127 may also include a processing unit 103 for use in processing signals. Also shown are a power controller 107, a decode processor 158, and a power amplifier 108.

The steps of the methods discussed may also be stored as instructions in the form of software or firmware 43 located in memory 161 in the Node B 110, 111, 114, as shown in FIG.

15C. These instructions may be executed by the control unit 162 of the Node B 110, 111, 114 in FIG. 15C. Alternatively, or in conjunction, the steps of the methods discussed may be stored as instructions in the form of software or firmware 42 located in memory 116 in the UE 123-127. These instructions may be executed by the processing unit 103 of the UE 123-127 in FIG. 15D.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other exemplary embodiments without departing from the spirit or scope of the invention. Thus, the present invention is not intended to be limited to the exemplary embodiments shown herein but is to be accorded the widest scope consistent with the principles and novel features disclosed herein. The present invention is not to be limited except in accordance with the following claims.

The invention claimed is:

1. A method for recovering data from a received signal comprising a first user pilot and an interference signal, the method comprising:
   estimating the pilot from the received signal to generate a first-pass pilot estimate;
   cancelling the first-pass pilot estimate from the received signal to generate a first cancelled signal;
   estimating the interference signal from the first cancelled signal to generate an interference estimate;
   cancelling the interference estimate from the first cancelled signal to generate an interference-cancelled signal;
   re-estimating the pilot from the interference-cancelled signal to generate a second pilot estimate; and
   demodulating a signal derived from the received signal using the second pilot estimate to recover data from the received signal.

2. The method of claim 1, the signal derived from the received signal being the interference-cancelled signal.

3. The method of claim 1, the interference signal comprising a second user pilot.

4. The method of claim 1, the re-estimating the pilot from the interference-cancelled signal comprising:
   adding the first-pass pilot estimate to the interference-cancelled signal to generate a reconstructed signal; and
   estimating the second pilot estimate from the reconstructed signal.

5. The method of claim 1, further comprising cancelling the second pilot estimate from the interference-cancelled signal prior to demodulating the signal derived from the received signal, the signal derived from the received signal comprising the results of cancelling the second pilot estimate from the interference-cancelled signal.

6. A method for recovering data from a received signal comprising a first user pilot and an interference signal, the method comprising:
   estimating the first user pilot from the received signal to generate a first-pass pilot estimate;
   cancelling the first-pass pilot estimate from the received signal to generate a first cancelled signal;
   re-estimating the first user pilot from a signal derived from the first cancelled signal to generate a second pilot estimate;
   demodulating a signal derived from the received signal using the second pilot estimate to recover data of a first user from the received signal; and
   if the data is successfully recovered: reconstructing the first user pilot based on successfully decoded data, and cancelling the reconstructed first user pilot from the received signal.

7. The method of claim 6, further comprising:
   if the data is successfully recovered: reconstructing a first user data signal from the successfully reconstructed data, and cancelling the reconstructed first user data signal from the received signal.

8. The method of claim 7, the data signal comprising a traffic signal.

9. The method of claim 7, further comprising:
   estimating a second user pilot from the received signal, and cancelling the estimated second user pilot from the received signal to generate a third cancelled signal;
   re-estimating the second user pilot from a signal derived from the first cancelled signal to generate a third pilot estimate, the re-estimating the second user pilot performed after the cancelling the reconstructed first user data signal from the received signal;
   demodulating a signal derived from the received signal using the third pilot estimate to recover second user data from the received signal.

10. The method of claim 6, further comprising:
    if the data is not successfully recovered: re-estimating the first user pilot, and cancelling the re-estimated pilot from the received signal at the end of a frame of the first user.

11. The method of claim 10, wherein the frame is a virtual frame of the first user.

12. An apparatus for recovering data from a received signal comprising a first user pilot and an interference signal, the apparatus comprising:
    a first-pass and residual pilot estimation/reconstruction block configured to:
      generate a first-pass estimate of the first user pilot;
      cancel the first-pass estimate from the received signal to generate a first cancelled signal;
      estimate the interference signal from the first cancelled signal to generate an interference estimate;
      cancel the interference estimate from the first cancelled signal to generate an interference-cancelled signal; and
      generate a second estimate of the first user pilot by re-estimating the pilot of the first user from the interference-cancelled signal; and
    a demodulator configured to demodulate a signal derived from the received signal using a second estimate of the first user pilot to recover data of a first user from the received signal.

13. The apparatus of claim 12, the signal derived from the received signal being the interference-cancelled signal.

14. The apparatus of claim 12, the interference signal comprising a second user pilot.

15. The apparatus of claim 12, the first-pass and residual pilot estimation/reconstruction block configured to generate the second estimate by adding the first-pass pilot estimate to the interference-cancelled signal to generate a reconstructed signal, and estimating the second pilot estimate from the reconstructed signal.

16. The apparatus of claim 12, the first-pass and residual pilot estimation/reconstruction block further configured to generate the second estimate by adding the first-pass pilot estimate to the interference-cancelled signal to generate a reconstructed signal, and cancel the second estimate of the first user pilot from the interference-cancelled signal prior to demodulating the signal derived from the received signal, the signal derived from the received signal comprising the results of cancelling the second estimate from the interference-cancelled signal.

17. The apparatus of claim 12, the apparatus comprising a base station.

18. An apparatus for recovering data from a received signal comprising a first user pilot and an interference signal, the apparatus comprising:
    a first-pass and residual pilot estimation/reconstruction block configured to:
      generate a first-pass estimate of the first user pilot;
      cancel the first-pass estimate from the received signal to generate a first cancelled signal; and
      re-estimate the first user pilot from a signal derived from the first cancelled signal to generate a second pilot estimate; and
    a demodulator configured to demodulate a signal derived from the received signal using the second pilot estimate to recover first user data from the received signal; and
    the first-pass and residual pilot estimation/reconstruction block further configured to, if the data is successfully recovered: reconstruct the first user pilot based on successfully decoded data, and cancel the reconstructed first user pilot from the received signal.

19. The apparatus of claim 18, the first-pass and residual pilot estimation/reconstruction block further configured to, if the data is successfully recovered: reconstruct a first user data signal from the successfully reconstructed data, and cancel the reconstructed first user data signal from the received signal.

20. The apparatus of claim 18, the data signal comprising a traffic signal.

21. The apparatus of claim 18, the first-pass and residual pilot estimation/reconstruction block further configured to: estimate a second user pilot from the received signal, and cancel the estimated second user pilot from the received signal to generate a third cancelled signal, and to re-estimate the second user pilot from a signal derived from the first cancelled signal to generate a third pilot estimate, the re-estimating the second user pilot performed after the reconstructed first user data signal from the received signal is cancelled, the demodulator further configured to demodulate a signal derived from the received signal using the third pilot estimate to recover second user data from the received signal.

22. The apparatus of claim 18, the first-pass and residual pilot estimation/reconstruction block further configured to, if the data is not successfully recovered:
   re-estimate the first user pilot, and cancel the re-estimated pilot from the received signal at the end of a frame of a first user.

23. The apparatus of claim 22, wherein the frame is a virtual frame of the first user.

24. The apparatus of claim 18, the apparatus comprising a base station.

25. An apparatus for recovering data from a received signal comprising a first user pilot and an interference signal, the apparatus comprising:
   means for performing first-pass pilot interference cancellation of the first user pilot on the received signal to generate a first cancelled signal;
   means for estimating and cancelling the interference signal from the first cancelled signal to generate an interference-cancelled signal; and
   means for demodulating a signal derived from the received signal using a re-estimated first user pilot to recover first user data from the received signal.

26. An apparatus for recovering data from a received signal comprising a first user pilot and an interference signal, the apparatus comprising:
   means for performing first-pass pilot interference cancellation of the first user pilot on the received signal to generate a first cancelled signal;
   means for demodulating a signal derived from the received signal using a re-estimated first user pilot to generate a second pilot estimate to recover data of a first user from the received signal; and
   means for, if the data is successfully recovered: reconstructing the first user pilot based on successfully decoded data, and cancelling the reconstructed first user pilot from the received signal.

27. A computer program product for recovering data from a received signal comprising a first user pilot and an interference signal, the product comprising:
   computer-readable storage medium comprising:
      code for causing a computer to perform first-pass pilot interference cancellation of the first user pilot on the received signal to generate a first cancelled signal;
      code for causing a computer to estimate and cancel the interference signal from the first cancelled signal to generate an interference-cancelled signal; and
      code for causing a computer to demodulate a signal derived from the received signal using a re-estimated first user pilot to recover first user data from the received signal.

28. A computer program product for recovering data from a received signal comprising a first user pilot and an interference signal, the product comprising:
   computer-readable storage medium comprising:
      code for causing a computer to perform first-pass pilot interference cancellation of the first user pilot on the received signal to generate a first cancelled signal;
      code for causing a computer to demodulate a signal derived from the received signal using a re-estimated first user pilot to generate a second pilot estimate to recover data of a first user from the received signal; and
      code for causing a computer to, if the data is successfully recovered: reconstruct the first user pilot based on successfully decoded data, and cancel the reconstructed first user pilot from the received signal.

29. The apparatus of claim 25, further comprising:
   means for adding the first-pass pilot estimate to the interference-cancelled signal to generate a reconstructed signal; and
   means for estimating a second pilot estimate from the reconstructed signal.

30. The apparatus of claim 26, further comprising:
   if the data is not successfully recovered: means for re-estimating the first user pilot, and cancelling the re-estimated pilot from the received signal at the end of a frame of the first user.

31. The computer program product of claim 27, further comprising code for causing a computer to: add the first-pass pilot estimate to the interference-cancelled signal to generate a reconstructed signal; and
   estimate a second pilot estimate from the reconstructed signal.

32. The computer program product of claim 28, further comprising code for causing a computer to:
   if the data is not successfully recovered: to re-estimate the first user pilot, and to cancel the re-estimated pilot from the received signal at the end of a frame of the first user.

* * * * *